(12) United States Patent
Johnson et al.

(10) Patent No.: US 6,792,336 B1
(45) Date of Patent: Sep. 14, 2004

(54) LEARNING-BASED CONTROLLER FOR BIOTECHNOLOGY PROCESSING, AND METHOD OF USING

(75) Inventors: John A. Johnson, Idaho Falls, ID (US); Daphne L. Stoner, Idaho Falls, ID (US); Eric D. Larsen, Idaho Falls, ID (US); Karen S. Miller, Idaho Falls, ID (US); Charles R. Tolle, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/647,134
(22) PCT Filed: May 13, 1999
(86) PCT No.: PCT/US99/10611
§ 371 (c)(1),
(2), (4) Date: Sep. 26, 2000
(87) PCT Pub. No.: WO99/58479
PCT Pub. Date: Nov. 18, 1999

Related U.S. Application Data
(60) Provisional application No. 60/085,420, filed on May 13, 1998.

(51) Int. Cl.[7] .............................. G05B 21/00; C07C 1/02
(52) U.S. Cl. .................... 700/266; 435/262; 75/712; 700/46
(58) Field of Search .................. 700/266; 435/262; 75/712

(56) References Cited

U.S. PATENT DOCUMENTS 3,986,932 A * 10/1976 Brushwyler et al. .......... 435/3
5,672,194 A * 9/1997 Hunter et al. ................. 75/712

* cited by examiner

Primary Examiner—Leo Picard
Assistant Examiner—Sheela S. Rao
(74) Attorney, Agent, or Firm—Trask Britt PC

(57) ABSTRACT

The present invention relates to process control where some of the controllable parameters are difficult or impossible to characterize. The present invention relates to process control in biotechnology of such systems, but not limited to. Additionally, the present invention relates to process control in biotechnology minerals processing. In the inventive method, an application of the present invention manipulates a minerals bioprocess to find local exterma (maxima or minima) for selected output variables/process goals by using a learning-based controller for bioprocess oxidation of minerals during hydrometallurgical processing. The learning-based controller operates with or without human supervision and works to find processor optima without previously defined optima due to the non-characterized nature of the process being manipulated.

24 Claims, 26 Drawing Sheets

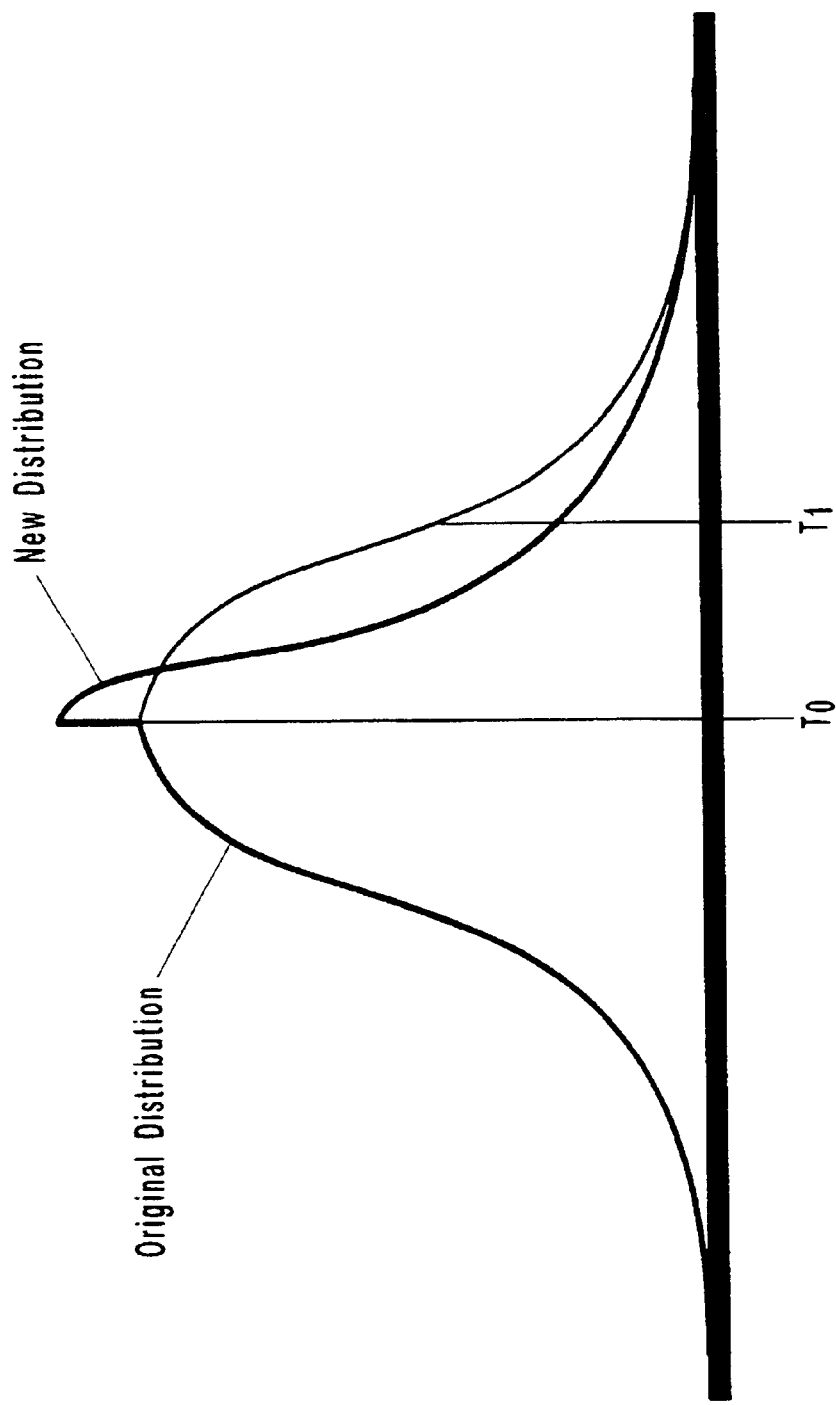

LEARNING-BASED CONTROLLER FOR BIOTECHNOLOGY PROCESSING, AND METHOD OF USING

RELATED APPLICATION

This application claims priority to PCT application Ser. No. PCT\US99\10611, filed May 13, 1999 and provisional application Ser. No. 60/085,420, filed May 13, 1998.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

The present invention relates to process control where at least some of the controllable parameters are difficult or impossible to characterize or are unknown. More particularly, the present invention relates to process control in biotechnology. Even more particularly, the present invention relates to process control in biotechnology minerals processing. In particular, an application of the present invention relates to a Bioexpert, learning-based controller for bioprocess alteration of minerals for hydrometallurgical processing.

2. Relevant Technology

Traditional process control technology uses mathematical models based on well-defined and well-measured process states. Thereby, allowing the use of mathematical and well-understood control schemes or a series of control schemes, such as PID, Pole Placement, LQR/LTG, $H^\infty$, ARMA based Adaptive Control, etc., to control the processes.

The biotechnology processing industry differs greatly from the more traditional process control industry. This difference largely stems from the biological uncertainties and complexities of these systems. These uncertainties manifest themselves in a radically more complicated process mechanisms and interactions to the process operator through the process' varying, undefinable and unpredictable nature. To this end, process control engineers in the biotech industry rely upon well-defined environmental process disturbances such as temperature, pH, electrode potential, dissolved oxygen (DO), biomass density, and process flow rates to control the process. The bioprocess engineer acts to restrictively minimize the effects of environmental disturbances upon the process due to the highly complex nature of a biosystem's reaction to these environmental disturbances.

In the mining industry, it is well known that an ore body will have both gradual and radical changes in its composition throughout the ore body. As the ore is mined by the mining engineer, the process engineer must work closely with the mining engineer and the laboratory in characterizing the chemical and physical nature of the ore body. This newly developed characterization must be taken into account when the ore body is processed within the mill in order to continue the maximum production rates. Traditionally, this could involve recalculation of the process control parameters.

Additionally, a process engineer in the mining industry has the problem of transferring experience learned during the processing of one ore body to subsequent ore bodies that are to be processed. This problem is due to the fact that ore bodies are usually highly site specific, i.e. composition specific, such that an entirely different process stream, processing approach, and process control scheme must be taken.

When a process engineer integrates bioprocessing with minerals processing, the complexity of the combination often becomes greater than the sum of its parts. Particularly, a culture of minerals-processing-microorganisms designed for the ore refining/leaching process will respond in complicated and unpredictable ways to well-defined process disturbances such as temperature, pH, flow rate, and the like. It is these very facts that limits the use of mathematical model based control schemes. Added to these complications of the bioprocessing field are the site-specific nature of each ore body and the sometimes radical variations of the chemical and physical qualities of the ore within a single ore body.

Microbial treatment has been proven to be an economically viable approach for the recovery of metals from some low-grade ores. Minerals bioprocessing utilizes mixed cultures of iron- and sulfur-oxidizing acidophilic bacteria that cause the oxidation of mineral structures with the concomitant liberation of metals from the ore. During biological ore oxidation, the microbial population change, the pH of the environment can increase or decrease, temperature generally increases, dissolved $O_2$ and $CO_2$ concentrations decrease, and the concentration of metals in the leach liquor generally increases.

Due to the elevated temperatures (50 to 60° C. and higher) that can be achieved during biological heap-leaching operations, moderately thermophilic bacteria are being considered as a way to extend the operating temperature range and improve oxidation efficiency in the heaps. Moderately thermophilic bacteria have been isolated from acidic coal dumps, ore deposits, mining operations, and hot spring environments. They vary in their ability to oxidize iron, sulfur, and pyrite as well as in their ability to grow autotrophically or heterotrophically. Temperature, pH, metal concentration, $O_2$, $CO_2$, and pulp density are known to affect growth and mineral oxidation by acidophilic bacteria. However, in a minerals processing environment in which any number of physical and chemical parameters are changing, the extent to which these parameters interact and impact iron oxidation by moderately thermophilic bacteria is unknown.

Moreover, minerals bioprocessing comprises very complex systems. The physical, chemical and biological components for minerals bioprocessing are not well characterized. In addition, the physical, chemical and microbial populations that are most favorable for optimum yields are often unknown and are radically different from one mine site to the next. More importantly, the physical and chemical conditions and microbial populations associated with these bioprocesses change with time or, as evident in heap leaching operations, are spatially variable. The changing conditions and microbial populations make it vital that a control system be robust and able to adapt to these changes. These underlining features rule out the use of traditional knowledge-based, neural network, fuzzy logic, and model-based intelligent controllers. Furthermore, traditional process optimization procedures may be inadequate to control highly variable, uncharacterized or unknowable conditions in minerals bioprocessing.

The minerals processing engineer using a bioprocess must stand a round-the-clock watching of all process parameters in an attempt to optimize minerals recovery while providing for the needs of the microorganism culture using his heuristic process knowledge. The minerals processing engineer routinely seeks correlation between input and output in order to simplify processing decisions and to maximize recovery. Many times the possible correlations in a microorganism minerals processing system become too many, too varied, and too complex. This makes the task of tracking any possible correlations between process inputs and goals an accounting nightmare, let alone a nearly unfeasible task. Additionally, because biotechnology processes use microorganisms, the microorganism nursery itself can become the source of a processing problem wherein contamination or inoculation of a culture from other microorganisms can kill, render ineffective, or even cause an optimizing transmutation of the microorganisms that will affect the biotechnology process in question.

What is needed is a method of controlling a process that can deal with the complexity of a bio-minerals process and that adjusts to an uncharacterized and unknown set of environmental changes.

What is also needed in the art is a method of cultivating microorganisms for biotechnology minerals processing that overcomes the problems of the prior art. What is also needed in the art is a method of minerals processing by contacting and maintaining a microbial population within an ore body. Additionally, mixed culture bioprocesses, such as those found in the mining industry, need to be developed and evaluated under conditions that will address more accurately the challenges of involved in this field. Intelligent control technologies need to be designed to handle the complexities inherent when examining multi-parametric effects on growth and metabolism by bacteria or when developing control strategies that are approximate for minerals processing bioprocesses.

SUMMARY AND OBJECTS OF THE INVENTION

An inventive stochastic reinforcement, learning-based control system was developed and applied to the supervision of uncharacterized, moderately thermophilic bacterial culture in a continuous stirred tank reactor (CSTR). The inventive system had as a process goal, e.g. to optimize the production of oxidized iron.

The control system has the ability to select environmental set point conditions, maintain those set points, analyze system states, and to recognize and diagnose instrument faults for the operator. Through the use of a stochastic reinforcement learning algorithm, the control system has the ability to adapt and optimize the uncharacterized process, such as the iron oxidation process performed by the thermophilic bacteria, within a mathematical process model. The inventive system serves as an outer loop controller, deriving its information from a plurality of inner loop controllers, sensor packages and a diagnostic system. The inventive system issues set point control values, e.g. pH, dilution rate, and temperature, to both traditional and intelligent inner loop controllers. Moreover, these inner loop controllers also function as tiered systems. That is the first layer of inner loop controllers in turn drive second layer inner loop fuzzy-based pH and temperature controllers, which also drives third layer inner loop fuzzy-based pump controllers.

The inventive method may include a software module that is one component of an hierarchical hardware and software system developed for the intelligent control of iron oxidation by or the cultivation of minerals processing microorganisms in a CSTR. The control system may use on-line sensors and off-line measurements to determine the state of the system and the state of the process goals. The inventive method is used to determine what actions are required to maximize process goals. These actions are carried out by lower level controllers using computer-controlled actuators, such as pumps, gas-flow valves, heaters, and stirrers.

The inventive method may use stochastic learning to determine what the system environmental/input parameters should be, based upon the current state and past history of the system. Lower-level fuzzy systems and standard classical methods within the lower lever controllers may then be used to actuate those commands and perturb the system to achieve the desired goals. The diagnostic system analyzes the sensor data for inconsistencies and provides a log of the system operation.

Identification of the state of the system precedes the decisions of how the directly controllable parameters should be changed. These decisions may be based upon the control strategy and are carried out according to the inventive method. Two such methods are described herein. The first procedure for process operation according to the inventive method may be carried out as follows:

1. Choose a new set of process parameters.
2. Run the system to steady state at a given set of conditions.
3. Determine process output parameter values.
4. Has the goal or goals been maximized for the current choice of set points?
   If yes, then maintain the process (until a change occurs), go to 2.
   If no, then return to 1.

The second procedure for process operation according to the inventive method may be carried out as follows:

1. Choose a set of process parameters.
2. Run the system to steady state at a given set of conditions.
3. Determine process output parameter values.
4. Change at least one process/environmental input parameter according to the inventive method.
5. Run the system to steady state under the at least one changed input parameter.
6. Determine process output parameter values.
7. Has the goal or goals been maximized for the current choice of set points?
   If yes, then choose a new set of process input parameters, different from those last chosen and go to 2.
   If no, then return to 4.

Working examples for both methods are described within the preferred embodiments. In specific the second method, mainly step 4, used a working example based on flow rate, an input parameter and peak production, an output parameter. The flow rate was chosen based on the approximate range of values that should bracket the peak production value using an expert system and an optimization algorithm. The initial flow rate was chosen by the operator, alternatively the inventive system controller was set to the last best value found or a default value that is in the center of the range. The second value was chosen to be 50% higher than the first value. The third value was chosen to be about 50% higher than the first value if the production rate increased. Alternatively, the third value was chosen to be about 33% lower than the first value if the production rate decreased.

After three or more different flow rate settings the optimization algorithm, a second-order polynomial fit was made to the data and the flow rate for maximum productivity was found from this function. The process terminated when the flow rate for the estimated maximum productivity was within the specified tolerance of the last trial.

In order to choose a new set of process parameters, a stochastic learning scheme was used to determine the temperature, pH, and iron inlet concentration. The temperature, pH, and iron inlet concentration were each given an inventive initial two-sided Gaussian distribution with defined limits. The low pH limit was based on what was expected to be the lowest pH at which growth would occur at a rate that could be accommodated without going to extremely low flow rates (outside of the low level controllers abilities) and, moreover, extremely long testing periods. The higher pH limit was the highest value that would not result in the precipitation of iron-hydroxides. The temperature range was based on the result of an experiment which examined the effects of temperature on biomass growth and iron oxidation. The lower inlet iron concentration was based on the lower flow limits of the flow equipment. The higher inlet iron concentration was based on the concentration that was used in the enrichment of a moderately thermophilic culture from a mining operation.

The center for these distributions were used as the initial set points. The initial widths of the distributions were chosen to span reasonable operating values for each parameter. When a new set point (pH, temperature, inlet iron concentration) was required as in Step 7 of the control strategy, a random number generator based on the above inventive distributions was used to select the new set points. The stochastic learning took place by adjusting the inventive distributions, mean, and composition standard deviation, depending on the relative production rates. If the rate improved with the new values, the center of the distribution was shifted to the new value and the width was increased in the direction of the change, while the width in the opposite direction was reduced. However, if the rate did not improve, the center of the distribution did not change, and the width in the direction of the change was decreased, as before the opposite direction was increased. The steps of the inventive algorithm may be illustrated in code as follows:

When at least one of the currently monitored process goals is better than the best recorded of the same, at least one of the process goals, then
  When the best set point is less than the current set point then
    increase the positive distribution width by a prescribed function which is based on at least the current set point and the best set point, decrease the negative width by the function or another function, reset the best set point to the current set point, and move the distribution to reflect the new best set point
  Otherwise
    decrease the positive distribution width by a prescribed function which is based on the current set point and the best set point, likewise increase the negative width by said function or another function, reset the best set point to the current set point, and move the distribution to reflect the new best set point
  Otherwise
    When the best set point is less than the current set point then
      decrease the positive distribution width by a prescribed function which is based on the current set point and the best set point, increase the negative width by the function or another function
    Otherwise
      increase the positive distribution width by a prescribed function which is based on the current set point and the best set point, decrease the negative width by the function or another function
Loop.

The combined effects of pH, temperature, and iron concentration on growth and iron oxidation by moderately thermophilic, acidophilic enrichment cultures were examined in a continuous culture. The inventive control system was used to acquire and analyze the data then to select and maintain the sets of conditions that were evaluated. Originally, the cultures had been derived from a heap-leaching operation by cultivation at 55° C. in an acidic medium (pH 1.8) containing yeast extract and iron (100 mM $Fe^{2+}$). Data indicated that pH was important, but not the only parameter that affected iron oxidation and growth.

A relatively high pH in combination with a relatively low temperature, or a relatively low pH in combination with a relatively high temperature resulted in moderate to high oxidation rates. However, the cultures appeared sensitive to the combined effects of a relatively high pH (pH 1.84) and high temperature (51.5° C.). Under these conditions little cell growth and iron oxidation were observed. In a mixed culture containing mesophilic and thermophilic bacteria, the computer learned that at pH 1.8, 45° C., and an inlet iron concentration of 30–35 mM were most favorable for iron oxidation of the ore samples that were tested.

The results disclosed herein demonstrate an interactive effect between pH and temperature that impacted growth and iron oxidation by moderately thermophilic bacteria. In addition, the present invention demonstrates the use of an intelligent control system as a tool that can be used to understand the interactive effects of environmental parameters on microbial activity.

In the control of biological processes, the present invention demonstrates that intelligent sensing and control technologies can be used in situations in which conventional set point control strategies are not adequate or are impossible due to the lack of mathematical models required to implement them. The inventive system can handle uncertainty, qualitative knowledge, poorly or incompletely modeled processes, and unexpected events. In short, the inventive system is more robust than traditional control strategies with these conditions. The inventive system monitors the process itself and the product, as well as the process parameters, and can control the final product quality using mappings based on analytical models, numerical models, engineering experience, and qualitative operational knowledge. In short, the inventive system has been created to replace the human operator/engineer/scientist when optimization is required for a uncharacterized system or process.

Accordingly, it is an object of the present invention to control a system by an algorithm, wherein the system has intrinsic uncertainty, poorly or incompletely modeled process parameters, unpredictably changing process extrema (i.e. maxima and minima), unexpected load change events, and the like.

It is also an object of the invention to provide a process control system that optimizes processing in the face of undefined or poorly defined process parameters. It is also an object of the invention to provide a system that seeks a local optimum or local optima in a process in which elements of the process change in difficult-to-characterize ways. It is also an object of the invention to provide a process that learns from processing data and chooses weighted variable values between processing elements and products.

It is also an object of the present invention to provide a process control system that uses biological components that are uncharacterized at any given time and that are manipulated for process optimization without correlated or rigorous models thereof.

It is also an object of the present invention to provide a system that combines the inventive method with minerals processing that uses microorganisms that overcomes the problems of the prior art.

It is also an object of the present invention to provide a process control system that uses mineralogical components that are uncharacterized at any given time and that are manipulated for process optimization without correlated or rigorous models thereof.

It is also an object of the present invention to provide a process control system that uses a mixture of biological and mineralogical components, either or both of which are uncharacterized at any given time, and that are manipulated for process optimization without correlated or rigorous models thereof.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be understood, a more particular description of the invention briefly described above will be rendered by reference to a specific embodiment thereof which is illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5c illustrates the updating of the set point distribution range due to a new set point trial where the input parameter was increased, without an improvement in the process productivity, thus decreasing the width of the split distribution, or changing the limit that is approached by the direction of the difference by decreasing it, for the data range on the side of the data distribution toward which the input parameter was shifted according to the inventive method.

FIG. 15 illustrates continuous space plot for the composite data for all practical tests for the inventive stochastic learning method two with varying flow rate control. The size of the sphere is proportional to the productivity and the shade of the sphere is the productivity of the reactor defined later in the embodiment equation 22.

FIG. 16 illustrates continuous space plot for the composite data for all practical tests for the inventive stochastic learning method one with the flow rate fixed at $$7 \frac{m}{mi}.$$

The size of the sphere is proportional to the productivity and the shade of the sphere is the productivity of the reactor defined later in the embodiment of equation 22.

DETAILED DESCRIPTION OF THE PREFERRED EMBODIMENTS

Figure 1:
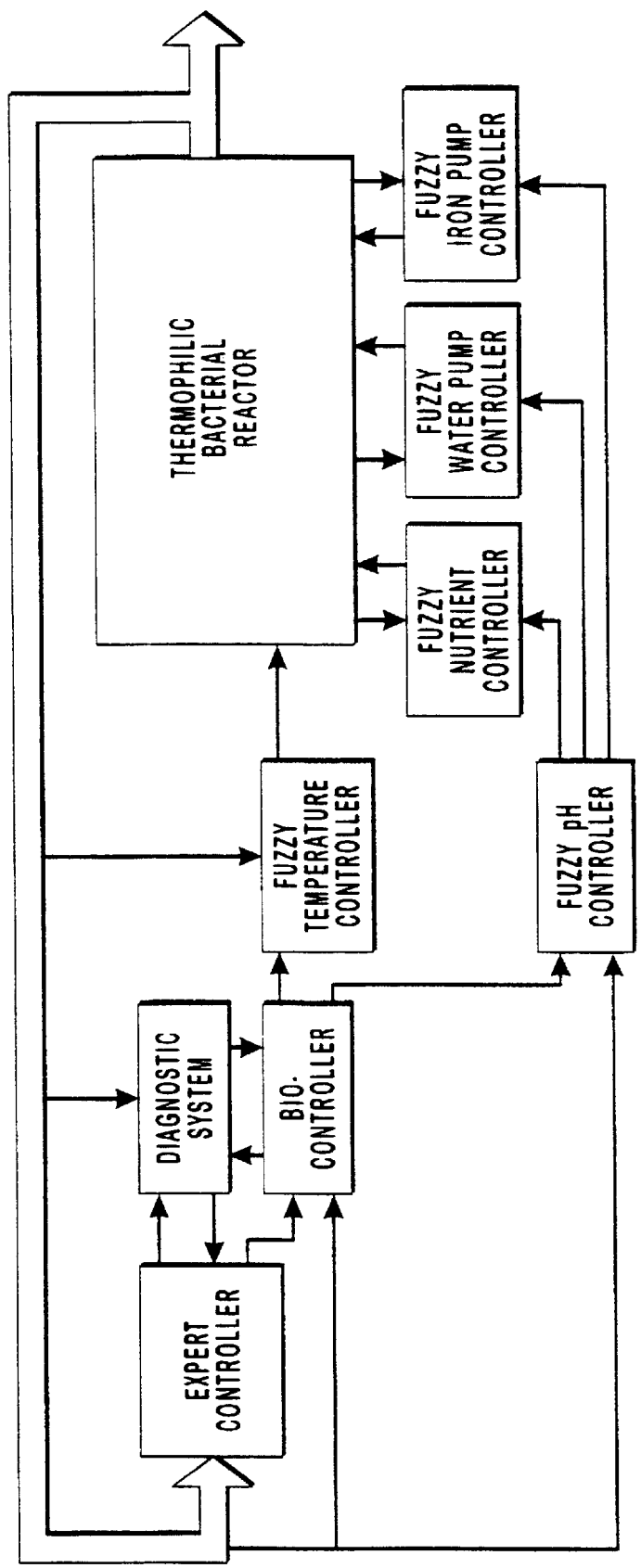
FIG. 1 is a schematic of the inventive method that uses the inventive system as an outer loop controller, an inner loop controller that oversees data acquisition and sends control statements to actuators, and a diagnostic system that sends state of the process messages to the outer loop controller and inner loop controller.

The present invention relates to process control using a stochastic learning algorithm that locally optimizes a process as environmental and reaction mechanism parameters change in ways that are difficult to correlate or characterize. For a process to be controlled by the inventive method, a set of processing/environmental parameters such as temperature, pH, aeration, $E_H$, feed rate, etc., must exist and be directly or indirectly controllable so that these set point values may be selected and changed in order to optimize the process. Process optimization procedures according to the inventive method evaluate the sets of parameters that maximize a production rate and/or product quality while resisting instabilities and perturbations by selecting what set points should be used, based on the current state of the process and the product.

The inventive method demonstrated that the relationships between the process parameter space, the process states, and the product property space, or inverse relationships are controllable without being correlated or rigorously defined. Sensing systems determined the states of the process as well as the products. Process models, when available, provided some of the relationships between the product properties and the process parameters. The inventive method used the above information to arrive at the various proper set points in order to optimize or achieve the set of process goals.

In order to better address the requirements for minerals bioprocessing control strategies, this invention discloses the integration or hybridation of a learning-based intelligent system with conventional bioprocess control technologies as a non-limiting example of application of the invention. This hybrid system was applied to an uncharacterized microbial culture that was obtained from an acidic heap-leaching operation. The operating objective was to evaluate the ability of the inventive hybrid control system, with its integral learning program, to control and optimize a process for which little expert knowledge was available.

Reference will now be made to the drawings wherein like structures will be provided with like reference designations. It is to be understood that the drawings are diagrammatic and schematic representations of the embodiment of the present invention and are not necessarily drawn to scale.

Control Methods

According to the present invention, the inventive method includes running a system to a defined steady state. Along the way to reaching a steady state, a data range and standard deviations for control parameters, both input and output, are established. Operator intervention may be used to establish range limits. For example, if it is known that a microorganism will not live or thrive outside a certain parameter range, the operator may set the range limits accordingly. Next standard deviations may be initialized for each input parameter by running the system for a sufficient time period to gather data therefor. The inventive method may then run the system for another cycle and tests the change in the productivity for a given input parameter. If the production of the system (tracking at least one output parameter) is better than the previous best production or a process improvement occurs, the system sets up an algorithm of changing input parameters through its learning how input parameter perturbations affect output parameters and process goals. According to the inventive method, an algorithm is used in which a plurality of input variables are manipulated in parallel to find a local maximum in at least one output parameter. The system to be controlled has no presupposed processing parameter optima at any given time as the system discovers local optima throughout the course of the process and as conditions change. An exemplary embodiment of the experimental invention follows.

Applied to a biochemical system in minerals processing, the inventive method has overcome the problems of the prior art by a stochastic learning scheme in which the computer, without rigorous modeling, expert systems, or even fuzzy logic, controls selected input parameters despite the absence of well-defined knowledge of the particular type of bacterial culture or cultures and despite rigorous characterization of the ore body in process.

Exemplary Embodiment

Biological System

Two iron-oxidizing bacterial cultures that thrive in acidic environments were used in this study. The cultures differed in their carbon source requirements, their growth temperature range, and the amount of "expert knowledge" that was available. One culture was an uncharacterized moderately thermophilic culture that was obtained from a mining operation by cultivation at 55° C. in an acidic medium (pH 1.8) containing yeast extract and iron. In contrast, the second iron-oxidizing culture, *Thiobacillus ferrooxidans*, has been well characterized in over 50 years of study. This bacterium uses carbon dioxide as its carbon substrate and grows well in acidic medium (~pH 2) within a temperature range of 20–32° C. There have been many studies which have examined the effects of parameters such as pH, temperature, air and $CO_2$ sparging rates, heavy metal concentration, and medium composition on the metabolism of *T. ferrooxidans*. In addition, the bioenergetics and genetics involved with mineral oxidation have been examined in great detail and there have been a number of analytical models developed which are used to describe mineral oxidation by this bacterium.

Cultures

In a first specific example, two thermophilic enrichment cultures were derived from a gold leaching operation. The first enrichment culture was used for the example that examined the effects of flow rate, then temperature. The second enrichment culture was used for the example that simultaneously varied pH, temperature, and inlet iron concentration. *Thiobacillus ferrooxidans*, ATCC 23270, was used in combination with the moderately thermophilic culture for the mixed culture embodiment. All cultures were grown in an acidic (pH 1.8) medium containing, per liter, $(NH_4)_2SO_4$, 0.4 g; $MgSO_4 \cdot 7H_2O$, 0.25 g; $K_2HPO_4$, 0.04 g; yeast extract, 0.2 g; and 50 mM $FeSO_4$. The $FeSO_4$ was added as a filter-sterilized solution after autoclaving the medium.

Initial Characterization

The bioreactor was operated at a temperature of 45° C., an aeration rate of 1 standard liter per minute (SLM), a pH of 2.0, and a stirrer speed of 400 rpm in acidic salts medium containing 50 mM $FeSO_4$. The bioreactor was inoculated with a culture grown at 55° C. then operated in batch mode for approximately 2½ days by which time the culture obtained a suspended cell density of approximately $10_7$ cells/ml. To determine relative growth and iron oxidation rates, the bioreactor was operated in continuous flow mode with flow rates, set by the inventors, that ranged from 6 to 13.5 ml/min (Dilution rate=D=0.265 to 0.596/hr). To examine the effects of temperature, the bioreactor was operated in continuous mode with a flow rate of 7 ml/min (D=0.309/hr) and temperatures of 40°, 30°, 50°, 45°, 55°, and 60° C. that were selected in that order by the inventors.

During the initial characterization, steady state determinations were made by the inventive system using the following criteria: after set points or flow rate were changed, a minimum of 5 residence times must elapse with at least 1 residence time between sampling events; redox values, $Fe^{2+}$ concentration, $Fe^{3+}$ concentration, and cell numbers do not vary more than 10%; and total iron concentration (the sum of $Fe^{2-}+Fe^{3+}$ values) are within 5% of the set point inlet iron concentration.

Considered Uncertainties

The majority of bioprocesses, particularly fermentation processes for the food, pharmaceutical and specialty chemical industries, utilize pure cultures that have been well described. At the start of this study, the number of distinct species present in the enrichment culture was unknown. Furthermore, all that was known about the culture was the cultivation medium, relative growth rate and temperature range. The metabolic mechanisms and yield coefficients for iron oxidation by the unchacterized culture were unknown. Thus, there was insufficient information to develop a model for the enrichment culture. Later in this study the addition of the mesophilic organism *Thiobacillus ferrooxidans* increased the complexity of the culture.

A process optimization procedure that simultaneously varied multiple parameters added another dimension of complexity of the system as well as the uncertainty of how the microbial culture would react. Most microorganisms are characterized or bioprocesses optimized by varying one parameter at a time. This assumes that the effects of environmental or bioprocess parameters such as pH, temperature, and nutrient levels are decoupled. However, in a mining bioprocess, any number of parameters can change. The metabolic response of microbial cultures when more than one physical or chemical characteristic is changing is unknown.

System Hardware:

A 2 L bio reactor with a working volume of approximately 1,360 mL (BioFlow I, New Brunswick Scientific Co., Inc. Edison, N.J.) was equipped with a stirrer, five liquid feeds, a heater, and sensors. The bio reactor was modified to accept remote signals from the computer control system for heating and stirrer speed. On-line sensors, fitted into the stainless steel head plate of the bio reactor, measured pH (Ingold Electrodes, Inc., Wilmington, Mass.), temperature (Cole-Parmer, Vernon Hills, Ill.), oxidation-reduction potential (Eh) (Ingold Electrodes, Inc.), and dissolved oxygen (Ingold Electrodes, Inc.). The pH and dissolved oxygen probes were interfaced to the computer with their respective transmitters (model 2300 pH transmitter, and model 4300 dissolved oxygen transmitter, Ingold Electrodes, Inc.). The redox and temperature probes were interfaced to the computer directly. Gas mass flow controllers were used for air (Sierra Instruments, Monterey, Calif.) and carbon dioxide (MKS Instruments, Andover, Mass.)

The computer system was a backplane chassis that was equipped with a SB586T series single-board computer (Industrial Computer Source, San Diego, Calif.) supporting a 233-MHz Intel Pentium processor. The SCXI (Signal Conditioning eXtension for Instrumentation) system (National Instruments, Austin, Tex.) provided front-end signal conditioning to an AT-MIO-16 plug-in data acquisition (DAQ) board. The SCXI modules, along with the DAQ board, provided a total of 47 analog input, 26 analog output, and 4 digital input-output channels. The SCXI bus routed analog, digital, timing, and triggering signals between modules and DAQ board. An eight-port serial board was added to give a total of 10 RS-232 serial lines when combined with the computer's two ports. The computer and all the instruments in the system were protected with a Fortress uninterruptible power supply (Best Power Technology, Inc., Nedecah, Wis.)

Measurements

Off-line measurements were made for biomass (cell counts), dissolved organic carbon, and ferrous ($Fe^{2+}$) and ferric ($Fe^{3+}$) iron. Off-line titration of $Fe^{2+}$ species with potassium dichromate or potassium permanganate was used to determine the concentration of ferrous iron. The concentration of ferric iron in solution was determined off-line by absorption of $Fe^{3+}$ at 304 nm. Cell counts were made by staining cells filtered onto black polycarbonate membrane filters with acridine orange or fluorescein-conjugated wheat germ agglutinin. Off-line measurements of dissolved organic carbon were performed by filtering samples (0.2 $\mu m$, Puradisc polypropylene filters, Whatman, International, Ltd., Maidstone, England) prior to analysis using an organic/inorganic carbon analyzer (TOC 5000, Shimadzu, Inc., Columbia, Md.).

On-line measurements were taken for Redox potential, which provided an estimate of the ferric to ferrous ion ratio, dissolved oxygen, pH, and temperature. Measurements of total organic carbon (TOC) and dissolved inorganic carbon ($CO_2$) were made hourly using an organic/inorganic carbon analyzer (TOC 5000, Shimadzu, Inc) on samples that were automatically withdrawn from the bioreactor.

Control System Implementation Description

The intelligent hybrid control system software was designed to determine and maintain set point conditions, analyze system state, and diagnose instrument faults. The software was written with LabVIEW, a graphical programming language (National Instruments Corporation, Austin, Tex.). LabVIEW provides a convenient user interface for the operator, as well as a sophisticated language interface to the I/O boards for data acquisition and control.

Figure 2:
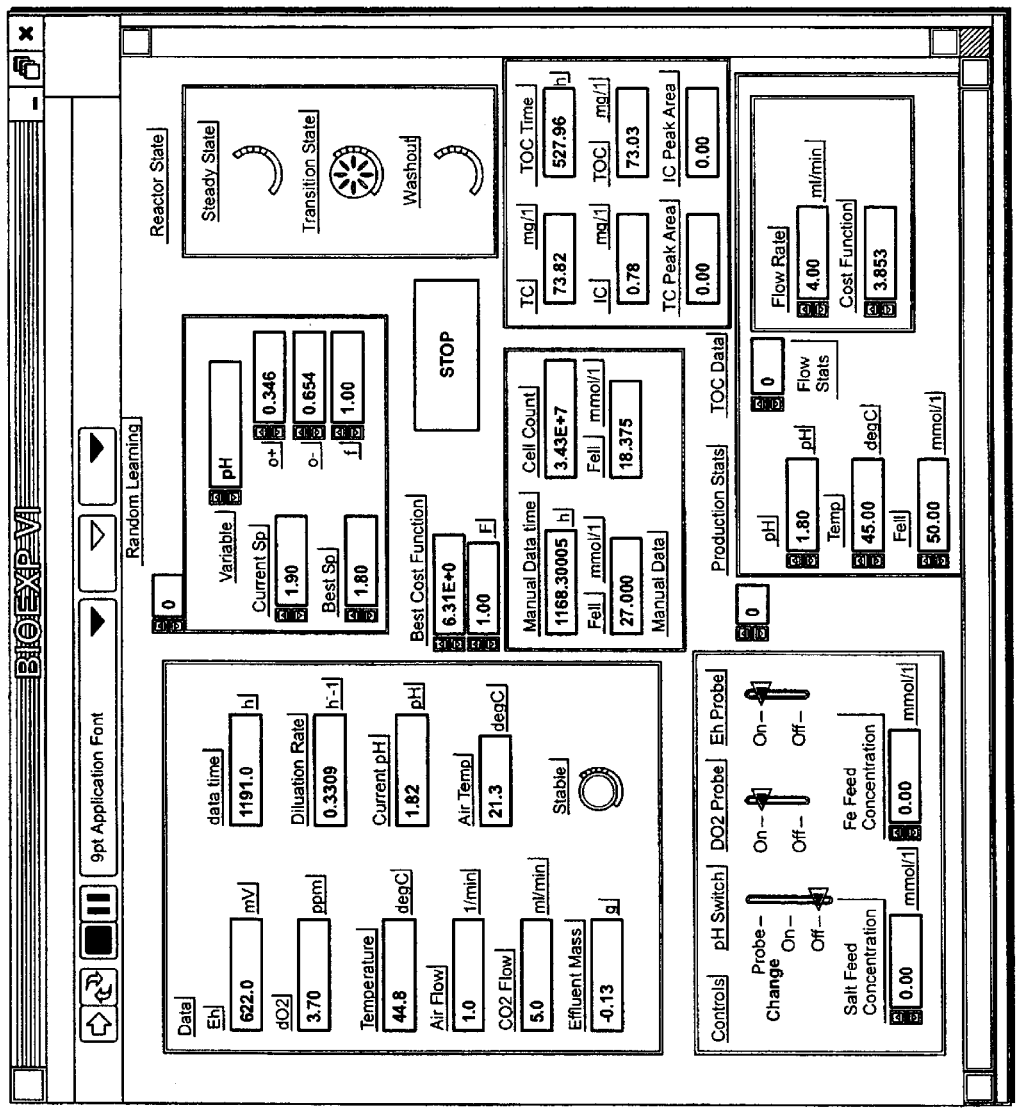
FIG. 2 is an example of a BioExpert operator display panel that illustrates a non-limiting embodiment.
Figure 3:
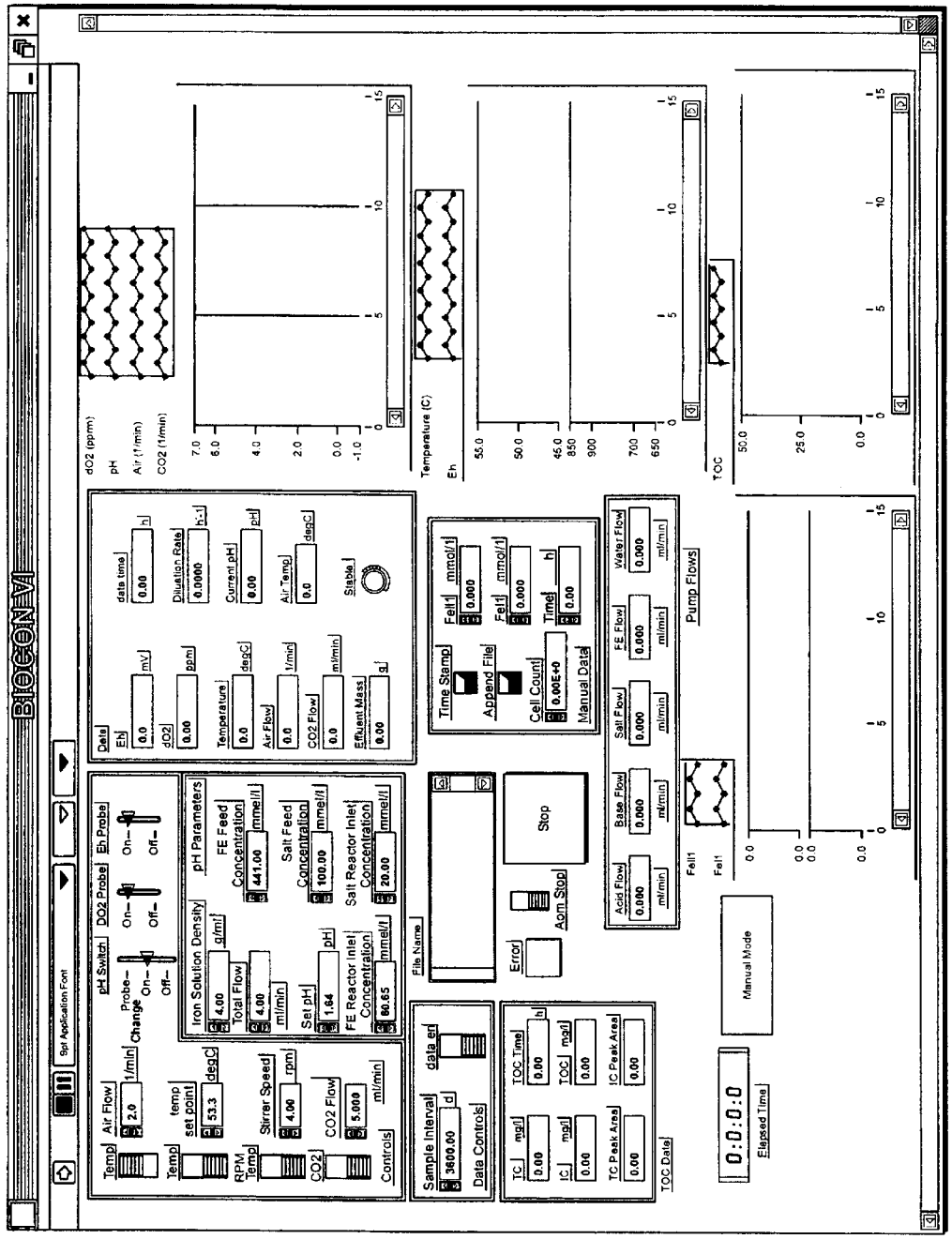
FIG. 3 is an example of a BioController operator display panel that illustrates a non-limiting embodiment.
Figure 4:
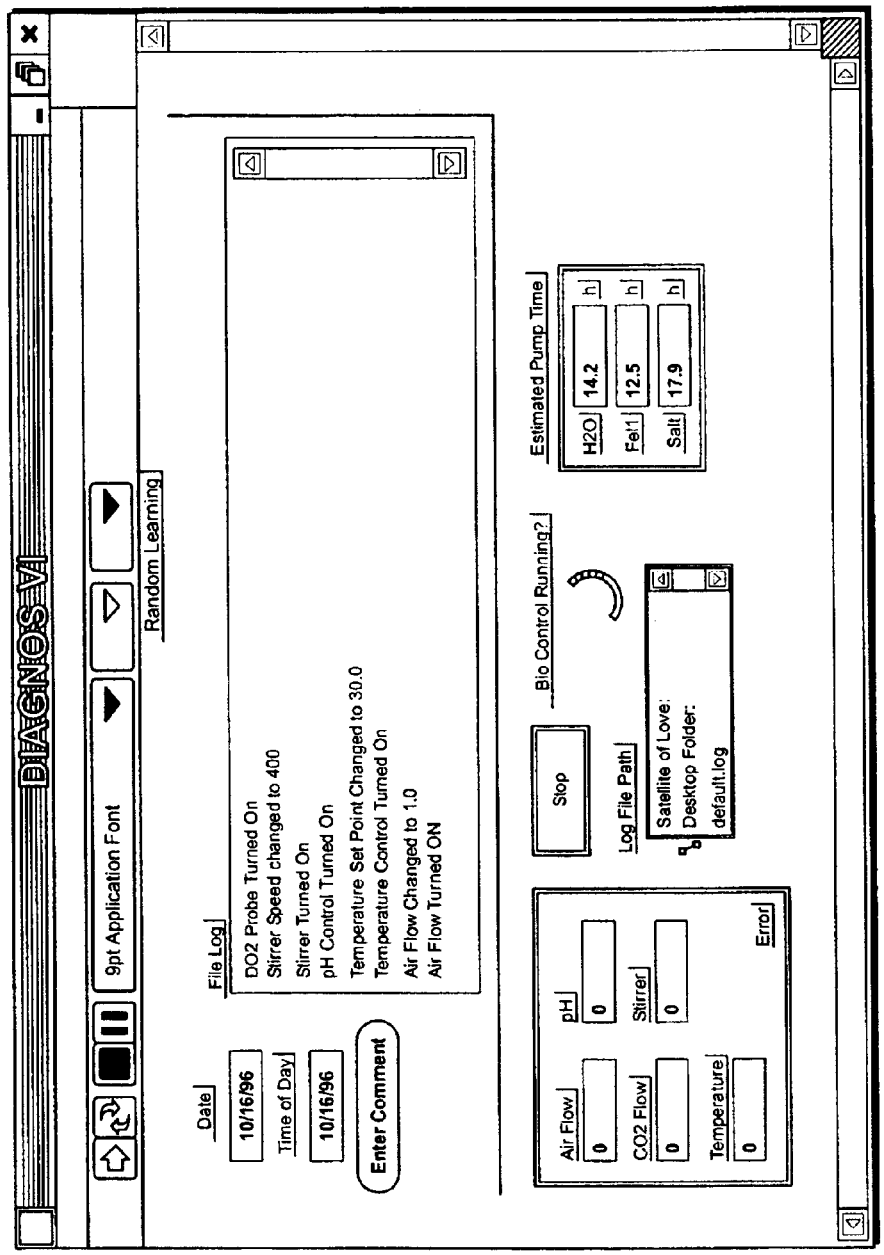
FIG. 4 is an example of a Diagnostic operator display panel that illustrates a non-limiting embodiment.

The intelligent hybrid control system, depicted in FIG. 1 consisted of three interacting software modules: the BioExpert Controller, the BioController, and the Diagnostics System. Associated with each program was an operating panel with various controls, indicators, graphs, and logs which provided information about the process at that control level as seen in FIGS. 2–4. The BioExpert Controller software module was the supervisory control module that integrated the information provided by the BioController and the Diagnostic System into its control decisions. The BioExpert Controller determined and displayed the current conditions within the bio reactor. It selected flow rates and it selected the parameters to be evaluated. It also displayed and maintained the log of production values. It also provided other information, e.g. set point values and current on-line sensor data.

The BioExpert as seen in FIG. 2 was the software control module that evaluated and supervised the bio reactor using data from the BioController and the Diagnostic System. Using the on-line and off-line data in connection with messages concerning set points changes, the BioExpert determined whether the bio reactor was in transition, at steady state, or being "washed out". Furthermore, the BioExpert used a stochastic learning procedure to determine what the system set points, such as pH, dilution rate, and temperature, should be during the next control step. This algorithm based its decisions on the current and past production values collected from the available data obtained by the BioController and the Diagnostics message log. These new set points were then sent to a "message board" for the human operator's confirmation and implementation within the BioController. Next, the flow rate controller within the BioExpert optimized the flow rates for the newly selected set points.

The BioController software module as seen in FIG. 3 was based on more traditional set point controllers and data acquisition systems. The BioController provided low-level set point control and acquired on-line sensor data inputs. It also allowed manual entry of off-line data, set point control values, time intervals for data acquisition, file names for data logging. Additionally, the BioController provided on/off switches for taking sensors off-line for cleaning and calibration, and displayed on-line and off-line data in graphs. It also maintained the data log and provided other information about the low-level operation the system, e.g. file name, elapsed time, etc.

Moreover, the BioController regulated conditions using computer-controlled pumps for nutrient feeds and pH control (acid and base pumps), gas-flow valves, a heater, and a stirrer. It should be noted that these lower-level set point control systems were made up of both fuzzy logic and conventional PID based controllers. Temperature and pH were feedback-controlled parameters that were controlled with fuzzy controllers. The pump controllers automatically re-calibrated to assure accurate dilution rates and feed concentrations. Liquid level was maintained by a drain tube located on the side of the chemostat. Gas flow rates were controlled open-loop. On-line data such as pH, temperature, dissolved oxygen, and off-line data such as cell numbers, $Fe^{2+}$, and $Fe^{3+}$ values were acquired, maintained as data logs, and presented as continually updated graphs on the computer screen as well as to the BioExpert.

The Diagnostics software module as seen in FIG. 4 diagnosed sensor data and automatically logged changes in set point and when sensors were taken off-line for maintenance. It also allowed manual entry of messages and posted errors, changes, and messages in a panel.

In addition, the Diagnostic software Module seen in FIG. 4 compared the sensor data with set-point values to determine if the data were consistent with the desired bio reactor operation. If not, a note would be logged into the file and posted on the front panel of the module. When a direct measurement of a set point value was possible, e.g., pH or temperature, the Diagnostics program compared the set point to the measured value and if they differed by a preset percentage for a significant period of time, a warning message was displayed to the operator panel of the module. Because there was no direct measure of r.p.m., indirect evidence was used to diagnose the failure of the stirrer. Diagnosis of stirrer failure was based on earlier observations that stirrer failure resulted in a dramatic decrease in dissolved oxygen and a dramatic increase in Redox values within one hour of stirrer failure.

The Diagnostic software Module automatically logged computer-generated messages, such as those dealing with changes in set points and when sensors were taken off-line then returned to service after maintenance and calibration. The Diagnostic software module also logged messages that were entered by the operated. All errors, changes, and messages were posted on the front panel for the operator to view as well as recorded to a log file. The Diagnostic software module communicated with the BioExpert to inform it of set point changes that indicated a system state change.

Best Fit Control of Flow

The flow rate controller used within the BioExpert was a hybrid sub-system based on an expert system and a best fit control concept. The expert system then selected the initial three flow rates for the best-fit control algorithm, see below. The best-fit control concept assumed that flow rate, $F_{rate}$, versus productivity, P (defined in Equations 22–25), fit a parabolic curve for a fixed set of conditions: pH ($SetPt_{current}^{pH}$); temperature ($SetPt_{current}^{temperature}$); and iron concentration ($SetPt_{current}^{Fe}$). Using the expert system's three initial flow rates productivities the best fit controller could then solve for the flow rate that maximizes the parabolic productivity curve. As additional flow rate data was obtained it was added to the initial data in each new best fit flow rate choice.

The flow rate expert system was defined by a prescribed function as follows (Run information is given in Table III):

1. The initial flow rate, $F_{rate}^1$ was selected by the operator for the first controller parameter set, pH, etc. (Run A). Alternatively, the expert system initialized its flow rate using the center of the allowable range, in this case $$5 \frac{ml}{min}.$$

For the subsequent control parameter sets, the first flow rate evaluated in each set of parameters was the last flow rate evaluated in the previous set ($SetPt_{current}^{pH}$, $SetPt_{current}^{temperature}$, $SetPt_{current}^{Fe}$). For example, the first flow rate evaluated in Run D, was the last flow rate evaluated in Run C.

2. The second flow rate was chosen using the following logic:
   If $$F_{rate}^1 \leq 7 \frac{ml}{min}$$

Then
   $F_{rate}^{target} = 1.5 F_{rate}^1$

Else $$F_{rate}^{target} = \frac{F_{rate}^1}{1.5}$$

3. The third flow rate was chosen as:

If $F_{rate}^1 \leq F_{rate}^2$ Then

If $P(F_{rate}^1) \leq P(F_{rate}^2)$ Then $$F_{rate}^{target} = 1.5 F_{rate}^2$$

Else $$F_{rate}^{target} = \frac{F_{rate}^1}{1.5}$$

Else

If $P(F_{rate}^2) \leq P(F_{rate}^1)$ Then $$F_{rate}^{target} = 1.5 F_{rate}^1$$

Else $$F_{rate}^{target} = \frac{F_{rate}^2}{1.5}$$

4. For the subsequent flow rates the parabolic fitting algorithm was used.

After three flow rates had been evaluated, the flow controller switched from the expert system to a prescribed function that was the parabolic data fitting algorithm. A least squares parabolic fit for productivity, P, verses flow rate, $F_{rate}$, curve was obtained by solving the following equation:

$$AB=Y \quad (1)$$

where $$A = \begin{bmatrix} 1 & F_{rate}^1 & (F_{rate}^1)^2 \\ 1 & F_{rate}^2 & (F_{rate}^2)^2 \\ & \vdots & \\ 1 & F_{rate}^{current} & (F_{rate}^{current})^2 \end{bmatrix} \quad (2)$$

$$B=[b_0 \; b_1 \; b_2]^T \quad (3)$$

$$Y=[P(F_{rate}^1) \; P(F_{rate}^2) \; \ldots \; P(F_{rate}^{current})]^T \quad (4)$$

Equation 1 was solved using a Singular Value Decomposition (SVD) that produced the pseudo inverse of A on the left. The SVD is a very stable method for performing this operation, as well as a conceptually simple pseudo inverse can be obtained using it. The SVD decomposes the matrix A into: a set of generalized eigenvectors on the left, U; a diagonal matrix, $\Delta$, whose values represent the singular values of the matrix; and a set of generalized eigenvectors on the right of the matrix, V.

$$A=U\Delta V^T \quad (5)$$

where the following properties hold:

$$U^T U=1 \quad (6)$$

$$VV^T=1 \quad (7)$$

$$V^T V=1 \quad (8)$$

Next the pseudo inverse on the left is defined as:

$$A_{left}^{-1}=V\Delta^* U^T \quad (9)$$

where $$\Delta^* = \frac{1}{\Delta(i,i)}$$

for $1 \leq i \leq \text{size}(\Delta)$; that is, invert the singular values along the diagonal.

It is easily shown that the above inverse does in fact invert the matrix A if it is multiplied on the left.

$$A_{left}^{-1} AB = A_{left}^{-1} Y \quad (10)$$

Thus the solution to Equation (1) can be written as:

$$B=V\Delta^* U^T Y \quad (10)$$

After a parabolic fit to the data was obtained, the critical point of the parabola was used to calculate the next flow rate target.

$$P_{target} = P(F_{rate}^{target}) = b_0 + b_1 F_{rate}^{target} + b_2 (F_{rate}^{target})^2 \quad (12)$$

$$\frac{dP_{target}}{dF_{rate}^{target}} = b_1 + 2b_2 F_{rate}^{target} = 0 \quad (13)$$

$$F_{rate}^{target} = -\frac{b_1}{2b_2} \quad (14)$$

As new flow rates were issued and new fits were calculated, the fits converge on the optimal choice of the flow rate for the given set of parameters. As the BioExpert changed the set points pH ($SetPt_{current}^{pH}$), temperature ($SetPt_{current}^{temperature}$), and iron concentration ($SetPt_{current}^{Fe}$) the fitting algorithm reset and the expert sub-system component of the flow controller restarted.

Stochastic Learning Controllers

A stochastic learning algorithm was used to determine the optimal pH, temperature, and iron concentration set points. Instead of a traditional Gaussian distribution, the distribution consisted of two half-Gaussian distributions. The approach differed in that the learning algorithm unevenly biased the two-sided Gaussian distribution that was used to choose the next set point. This was done to bracket the optimal solution more readily.

By using the mean of two half-Gaussian distributions, which are divided at each one's traditional mean, the mean of this new distribution remains the same as a traditional Gaussian.

$$\bar{x} = \int_{-\infty}^{+\infty} x f_x(x) dx \quad (15)$$

$$= \frac{1}{\sqrt{2\pi\sigma_L^2}} \int_{-\infty}^{\hat{m}} x e^{\left[\frac{-(x-\hat{m})^2}{2\sigma_L^2}\right]} dx + \quad (16)$$

$$\frac{1}{\sqrt{2\pi\sigma_R^2}} \int_{\hat{m}}^{+\infty} x e^{\left[\frac{-(x-\hat{m})^2}{2\sigma_R^2}\right]} dx$$

$$= \frac{\hat{m}}{2} + \frac{\hat{m}}{2} \quad (17)$$

$$= \hat{m} \quad (18)$$

In addition, the variance of the new distribution is also easily calculated.

$$\text{var}(x) = \int_{-\infty}^{+\infty} (x-\hat{x})^2 f_x(x) dx \qquad (19)$$

$$= \frac{1}{\sqrt{2\pi\sigma_L^2}} \int_{-\infty}^{\hat{m}} (x-\hat{m})^2 e^{\left[\frac{-(x-\hat{m})^2}{2\sigma_L^2}\right]} dx + \qquad (20)$$

$$\frac{1}{\sqrt{2\pi\sigma_R^2}} \int_{\hat{m}}^{+\infty} (x-\hat{m})^2 e^{\left[\frac{-(x-\hat{m})^2}{2\sigma_R^2}\right]} dx$$

$$= \frac{\sigma_L^2}{2} + \frac{\sigma_R^2}{2} \qquad (21)$$

Figure 5A:
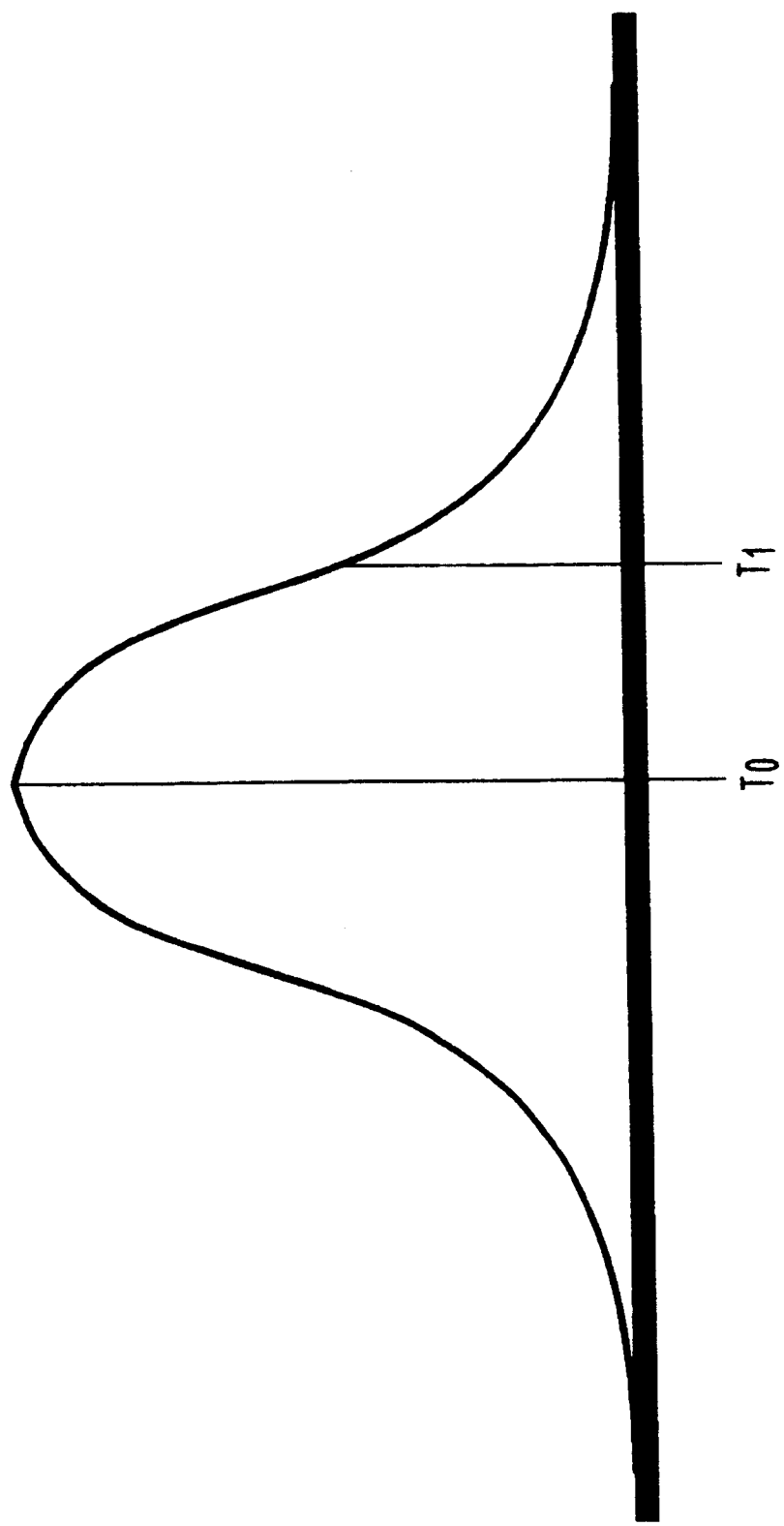
FIG. 5a illustrates selection of a new set point, $T_1$, within a defined or generated distribution range according to the inventive method.

The learning algorithm operated simultaneously for the three parameters that were evaluated, pH ($\text{SetPt}_{current}^{pH}$), temperature ($\text{SetPt}_{current}^{temperature}$) and iron concentration ($\text{SetPt}_{current}^{Fe}$). The initial mean was chosen as a guess at where the productivity, P, maximum was located (FIG. 5a, Table I). The initial widths, i.e., the quasi variances of the distributions or standard deviations ($\sigma_-^x$ and $\sigma_-^x$), were chosen to span a reasonable operating range for each parameter (FIG. 5a, Table I). The temperature range of 26° C. to 55° C. was based on experimental results obtained for the bacteria. The concentration range of 15 to 100 mM was based on the dead limits of the peristaltic pumps, and expert knowledge concerning the cultivation of the moderate thermophile. The pH range of 1.5 to 1.95 was based on expert knowledge. Moreover, the lower limit was based on the expected lowest pH at which growth would be at a rate sufficient to avoid extremely low flow rates. Avoiding low flow rates would avoid the dead-band limits of the pumps, minimize the possibility of washout, and avoid extremely long controller trials. The pH upper limit was chosen to avoid the formation of iron-hydroxides.

TABLE I

Initial Gaussian Distributions (x, $\sigma_+^x$, $\sigma_-^x$).

| x | $\hat{m}^x$ | $\sigma_{1+}^x$ | $\sigma_{1-}^x$ |
|---|---|---|---|
| PH | 1.8 | 0.5 | 0.5 |
| Temperature | 45 | 5.0 | 5 |
| $Fe^{2+} + Fe^{3+}$ | 50 | 15.0 | 15.0 |

Figure 5B:
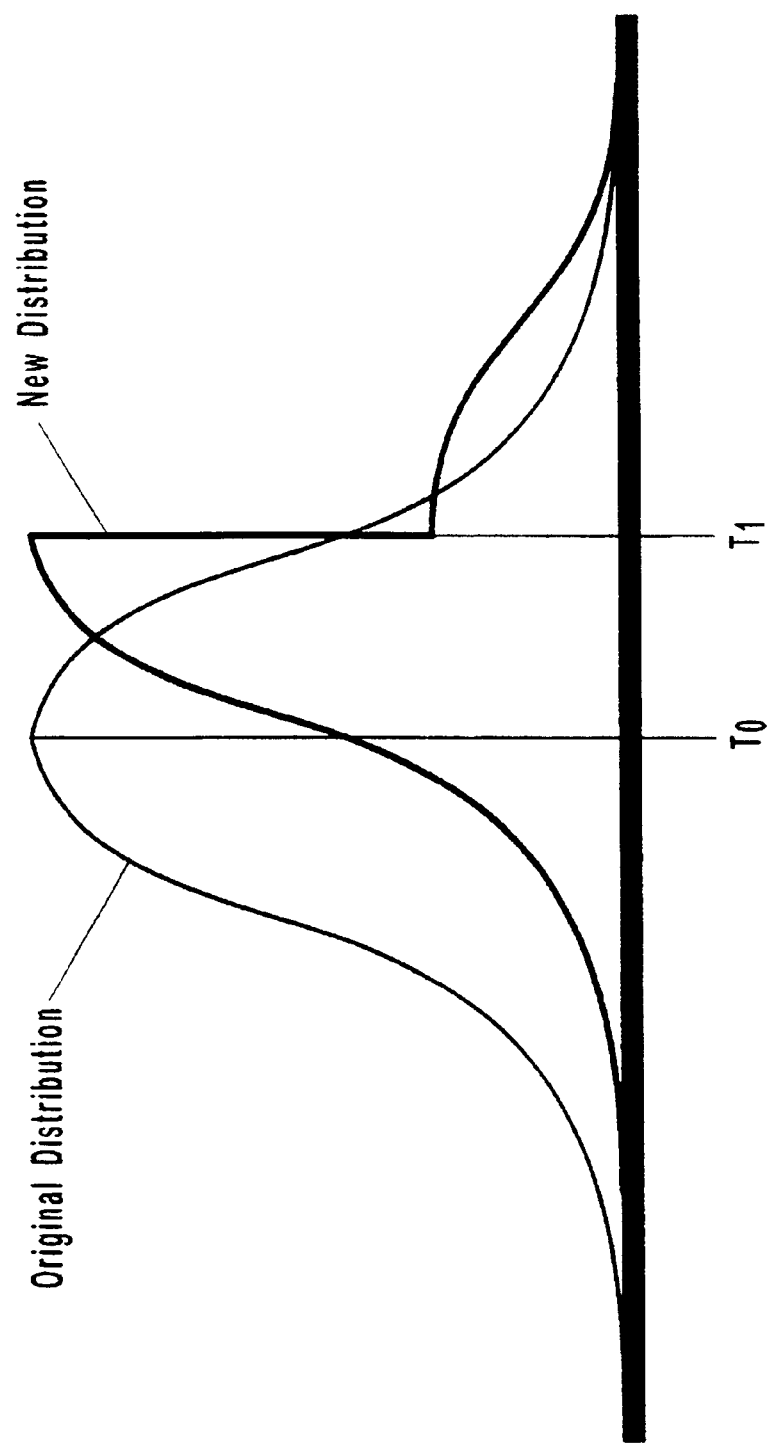
FIG. 5b illustrates the updating of the set point distribution range due to an improvement in the process productivity by increasing the input parameter, obtaining a favorable result, shifting the center of a distribution, and updating the right and left distributions according to the inventive method.
Figure 6A:
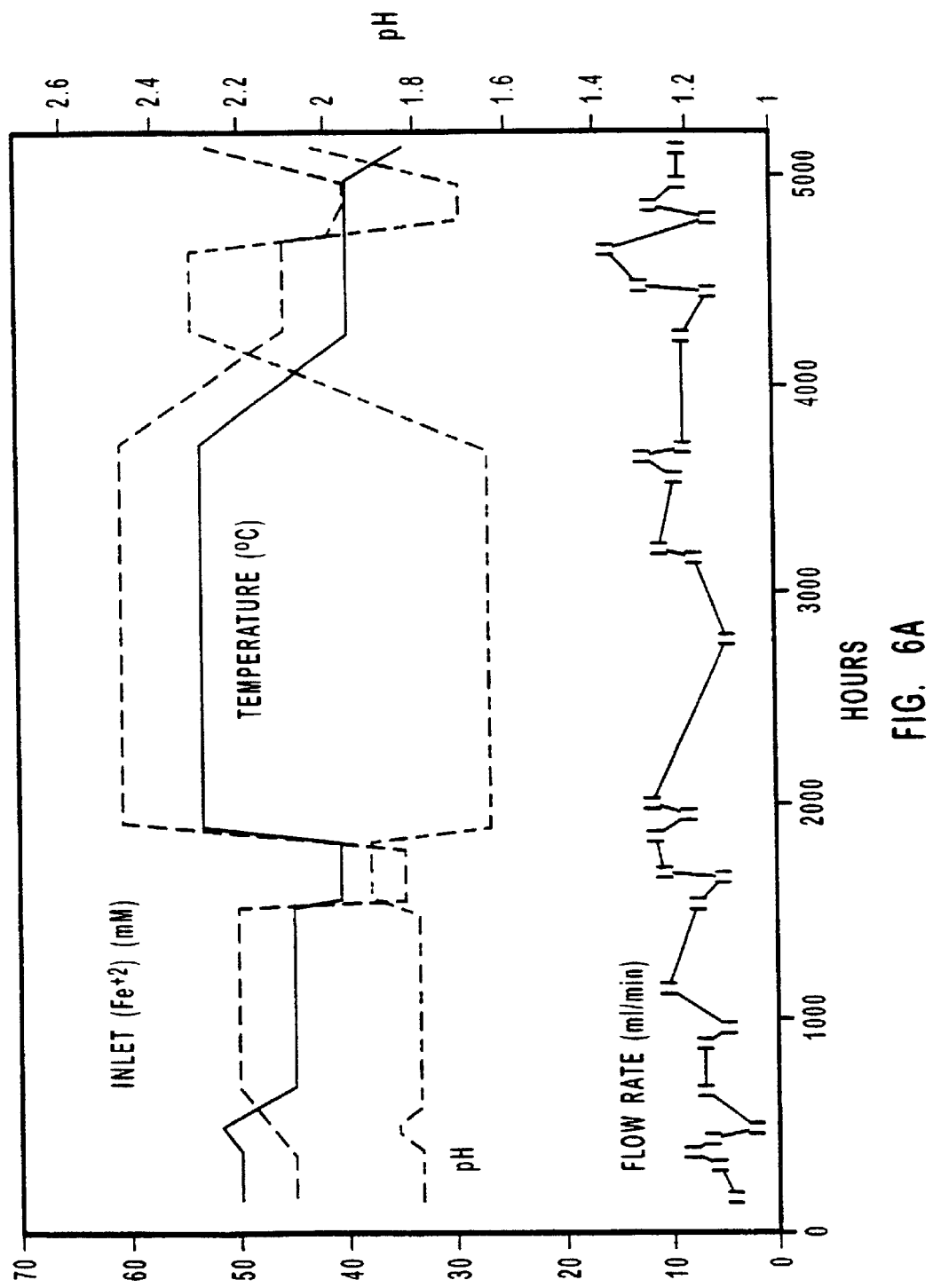
FIG. 6a illustrates a complete set of the inventive control system responses during the over 5000 hours of experimental embodiment testing of the invention in which the pH, temperature, iron inlet ($Fe^{2+}$), and flow rates were varied according to the inventive method. Symbols: pH(F), temperature (B), $Fe^{2+}$ (J), flow rate (H).
Figure 6B:
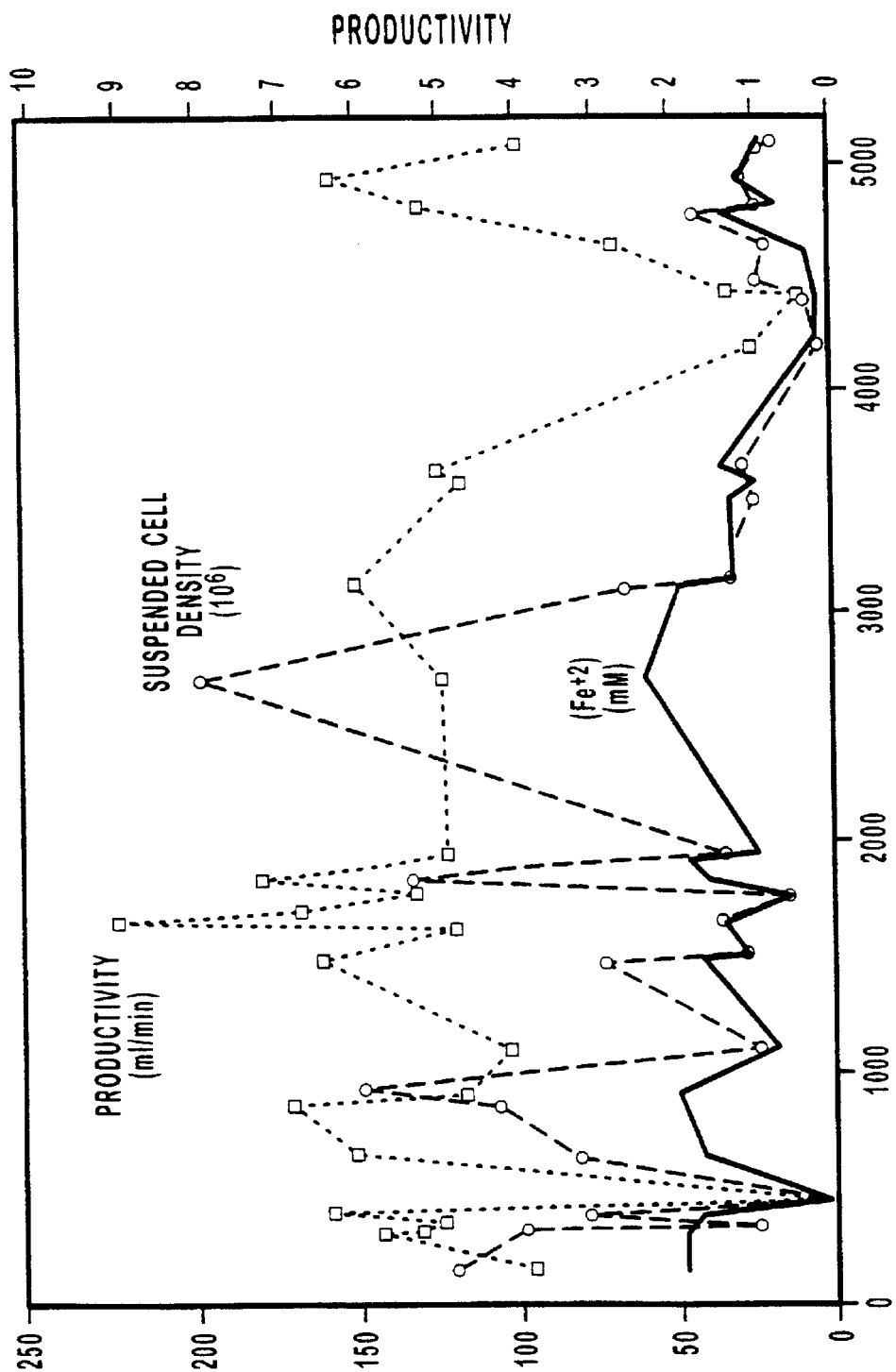
FIG. 6b illustrates some process outputs/measurements that were used in calculating the process productivity response during the over 5000 hours of experimental embodiment testing of the invention in which the pH, temperature, iron inlet ($Fe^{2+}$), and flow rates were varied according to the inventive method. Symbols: productivity (H), Biomass/Cells (J), $Fe^{3+}$ (B).
Figure 7:
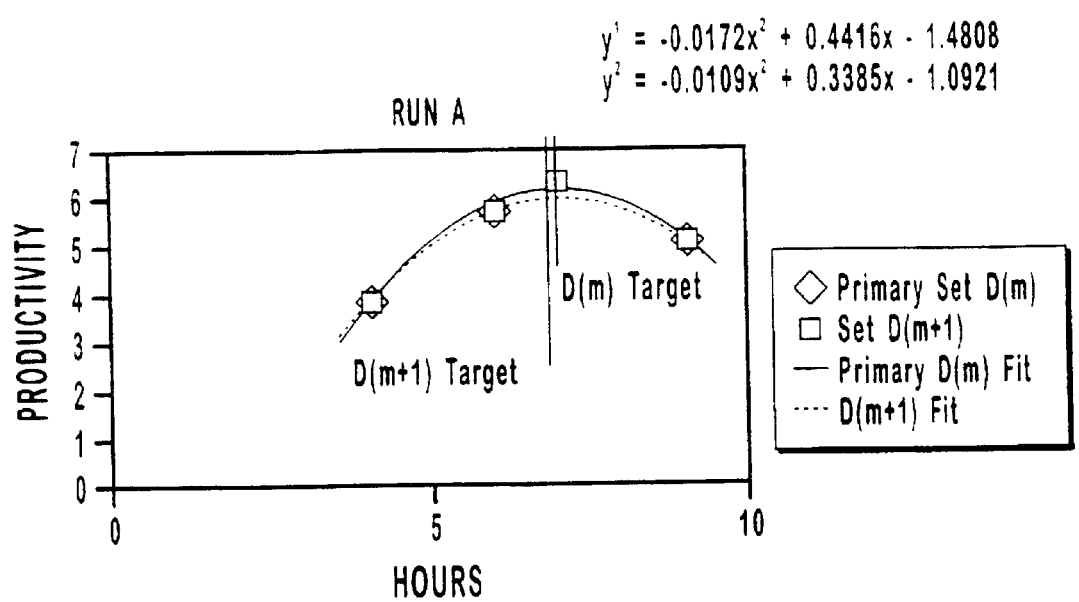
FIG. 7 illustrates a selected function for the flow rate optimization algorithm for flow rate choices for run A described in Table III given below, according to the inventive method.

The stochastic learning takes place by adjusting the distributions, e.g. mean and standard deviation, depending on the relative production rates. If the production rate improved with a tested set point, $T_1$, the new mean ($\hat{m}$) of the distribution was shifted to that set point. Also, at least one of the right and left widths, quasi variances, were changed to reflect the shift of the distribution towards the increase in productivity (FIG. 5b). For example, if an increase in temperature resulted in an increase in productivity, the right side or upper limit of the Gaussian was increased and the left side or lower limit (representing the range towards lower temperature) was decreased. However, if the rate did not improve, the mean of the distribution did not change, and the width of the distribution in the direction of the set point was decreased and the other side's width was increased (FIG. 5c). To continue the example, if an increase in temperature did not result in improved productivity, the mean remained the same, the right side of the Gaussian was decreased, and the left side, towards lower temperatures was increased. The choice for each new set point was made by using a random number generator based on the new two-sided Gaussian distributions (such as $T_1$ in FIG. 5a).

FIG. 5 may be also described by applying the inventive algorithm to the figures. The method of controlling the system comprises establishing a split data distribution for at least one input variable. The split data distribution is illustrated in FIG. 5a as comprising a standard Gaussian distribution with $T_0$ as the mean which may be ascribed the value of N. The split data distribution has an initial standard deviation, an upper limit and a lower limit as illustrated by the shape and end points of the Gaussian distribution. The method continues by running the system and first measuring at least one output variable. The inventive method continues by changing the value of the at least one input variable, in this instance, temperature, from the mean $T_0$ to a new input variable value of $T_1$, or in a generic example, N+1. Next, a second measuring of the at least one output variable is taken. If the output variable is improved, the inventive method proceeds by changing the mean of the at least one input variable to the new input variable value $T_1$, or in a generic example, N+1. The method continues by changing the upper limit, and changing the lower limit such that the split distribution reflects the original lower half of the Gaussian unchanged in height but shifted by a value of $T_1-T_0$, or generically N+1-N, and the upper limit is changed by a greater amount than the difference of $T_1-T_0$ or generically by an amount greater than N+1-N. Thus, the upper limit is changed, the lower limit is changed wherein the limit in the direction of the difference is changed more than the limit that was distanced by the direction of the difference. If the output variable is not improved, the mean is not changed, the limit that lies in the direction distanced by the direction of the difference is also not changed, and the limit in the direction of the difference is decreased.

FIGS. 5b and 5c illustrate specific examples of a temperature increase and resulting respective favorable and unfavorable reactions by the inventive algorithm. In FIG. 5b, the temperature increase results in an improved output variable. Thus, the mean of the distribution is raised to the temperature increase amount, $T_1$, the upper limit lies in the direction approached by the difference, and the lower limit lies in the direction distanced by the direction of the difference. Thus, the upper limit is changed in an amount greater than the lower limit, and the lower limit is moved by only by an amount reflected by the difference of the change between the temperature $T_0$ and the temperature $T_1$. As the area that is integrated under the split distribution must equal unity, it becomes clear that the upper limit in this example is changed by an amount greater than the amount of change in the lower limit.

Continuing with FIG. 5c, a temperature increase resulted in no improvement of the output variable. Therefore, the mean of the data distribution is not changed, the lower limit likewise is not changed, and the upper limit is decreased by an amount proportional to the difference between $T_0$ and $T_1$. Similar to FIG. 5b, the area under the split distribution curve in FIG. 5c still nominally equals unity. Thus, the new distribution, although having the same mean, has a higher Gaussian curve that is also narrower, or that has a smaller standard deviation.

One basic stochastic control algorithm that is also used, i.e. x is pH, temperature, and iron concentration, was (see Tables I and II for each individual controller values):
Initialize the distributions comprises:
$\text{SetPt}_{best}^x = \hat{m}^x$
$\sigma^x = \sigma_{i+}^x$
$\sigma^x = \sigma_{i-}^x$
Repeat forever:
Select $\text{SetPt}_{current}^x$, evaluate $P_{current}$ shown in the next section Calculate the standard deviation change:

$$\Delta \sigma^x = Sc^x \left| \frac{SetPt^x_{current} - SetPt^x_{best}}{SetPt^x_{best}} \right|$$

If $P_{current} > P_{best}$ then
   If $SetPt_{best}^x < SetPt_{current}^x$ then
      $SetPt_{best}^x = SetPt_{current}^x$
      $P_{best} = P_{current}$
      $\hat{m}^x = SetPt_{current}^x$
      $\sigma_+^x = \sigma_+^x + \Delta\sigma^x$ and $\sigma_-^x = \sigma_-^x - \Delta\sigma^x$
      (increase the width of the right half of the distribution and decrease the left half of the distribution)
   Else
      $SetPt_{best}^x = SetPt_{current}^x$
      $P_{best} = P_{current}$
      $\hat{m}^x = SetPt_{current}^x$
      $\sigma_+^x = \sigma_+^x - \Delta\sigma^x$ and $\sigma_-^x = \sigma_-^x + \Delta\sigma^x$
      (decrease the width of the right half of the distribution and increase the width of the left half of the distribution)
Else
   If $SetPt_{best}^x < SetPt_{current}^x$ then
      $\sigma_+^x = \sigma_+^x - \Delta\sigma^x$ and $\sigma_-^x = \sigma_-^x + \Delta\sigma^x$
      (decrease the width of the right half of the distribution and increase the width of the left half of the distribution)
   Else
      $\sigma_+^x = \sigma_+^x + \Delta\sigma^x$ and $\sigma_-^x = \sigma_-^x - \Delta\sigma^x$
      (increase the width of the right half of the distribution and decrease the left half of the distribution)
If $\sigma_+^x < 0.001$ then $\sigma_+^x = 0.001$
If $\sigma_-^x < 0.001$ then $\sigma_-^x = 0.001$
Loop.

In other words, the algorithm may be described as the following steps:

A method of operating a system with at least one input parameter and at least one output parameter, comprising the steps:

establishing a data distribution for at least one input parameter, each said data distribution having an upper fixed limit and a lower fixed limit, a mean, and a standard deviation;

randomly changing each of said input parameter, updating its standard deviation, and calculating the change in its standard deviation;

monitoring any change in said at least one output parameter;

if said change in said at least one output parameter constitutes a system improvement:
   quantifying a difference in said at least one input parameter;
   if said difference in said at least one input parameter is an increase:
      updating a positive standard deviation by adding the change in its standard deviation, and updating a negative standard deviation by subtracting the change in its standard deviation;
   if said difference in said at least one input parameter is a decrease:
      updating a positive standard deviation by subtracting the change in its standard deviation, and updating a negative standard deviation by adding the change in its standard deviation;

if said change in said at least one output parameter does not constitute a system improvement:
   quantifying a difference in said at least one input parameter;
   if said difference in said at least one input parameter is an increase:
      updating a positive standard deviation by subtracting the change in its standard deviation, and updating a negative standard deviation by adding the change in its standard deviation;
   if said difference in said at least one input parameter is a decrease:
      updating a positive standard deviation by adding the change in its standard deviation, and updating a negative standard deviation by subtracting the change in its standard deviation;

if said positive standard deviation is less than about 0.001, ascribing the value thereof to about 0.001;

if said negative standard deviation is less than about 0.001, ascribing the value thereof to about 0.001; and repeating said steps at least once.

Although a Gaussian distribution is used as an exemplary embodiment for the present invention, other distributions may be used. Another non-limiting example includes a simple equilateral triangle distribution that approximates a Gaussian distribution. Alternatively, the distribution may be simply two quarter-circular arcs such that the entire distribution appears to be a semi-circular arc bisected at the mean.

Additionally, a combination of distributions may be used such as a Gaussian distribution for one portion and a nominal triangular distribution for the other portion.

Where systems may react sharply to a given input variable change, the new set point mean for the data distribution may be somewhere between the old set point mean and the latest set point. This may have a moderating effect on output variable reaction.

TABLE II

Scaling Factors for $\Delta\sigma^x$ Calculations.

| X | $Sc^x$ |
|---|---|
| pH | 0.17 |
| Temperature | 1.67 |
| $Fe^{2+} + Fe^{3+}$ | 5.0 |

Supervision of Direct Control:

The BioExpert invoked a multi-step procedure that involved two integrated subcontrollers; the flow rate controller and the stochastic-leaning controller. The variables that used to find the conditions for optimal production were pH, temperature (T), iron concentration (Fe), and dilution rate (D) Productivity was defined as:

$$P = f(P_{iron}) + (1-f)(P_{cells}) \quad (22)$$

Where:

$$f \leq 1 \quad (23)$$

$$P_{iron} = \left[ \frac{Fe^{3+}}{Fe^{2+} + Fe^{3+}} \right] \times F_{rate}^{current} \quad (24)$$

$$P_{cells} = \left[ \frac{\text{Suspended cells numbers}}{1 \times 10^8} \right] \times F_{rate}^{current} \quad (25)$$

Bio reactor operation was as follows:

Set the algorithm step counter, k, to 0. Run the reactor to steady state for a given temperature ($SetPt_{current}^{temperature}$), pH ($SetPt_{current}^{pH}$), iron concentration ($SetPt_{current}^{Fe}$), and flow rate ($F_{rate}^{current}$) combination Calculate the production rate, P, (see equations 22–25)

$$P = \left[\frac{Fe^{3+}\text{concentraction}}{Fe^{2+} + Fe^{3+}\text{concentraction}}\right] \times F_{rate}^{current}$$

Pick a new flow rate, $F_{rate}^{current}$, (by the Best Fit Control of Flow method set forth above), k=k+1
Run the reactor to steady state
Calculate the production rate, P, (see equations 22–25)

$$P = \left[\frac{Fe^{3+}\text{concentraction}}{Fe^{2-} + Fe^{3+}\text{concentraction}}\right] \times F_{rate}^{current}$$

Has the peak production rate, P, for this set point step (temperature, pH, and iron concentration) been reached?
If k≧4 and $|P_{target} - P_{current}| \leq 1$ ml Then
   YES: Pick a new pH and temperature and go to Step 1
Else
   NO: Go to Step 3

The identification of the state is one of the key steps used by the BioExpert. Using the on-line and off-line data and messages concerning changes in set points, the BioExpert determined whether the bio reactor was in transition, at steady state or being "washed out". Reactor state determinations were made using the following three criteria. The reactor was defined to be at steady state when the following conditions were met. No set point changes were observed for at least 5 residence times. The Redox values change less than 10%. The $Fe^{+2}$ and $Fe^{+3}$ concentrations change less than 10%. And TOC changes less than 25%.

Likewise, the reactor was defined to be at washout when all of the following conditions were met. More than two residence times had passed since last set point change. TOC decreased by more than 50%. Redox values decreased by more than 25%. $Fe^{+2}$ concentration increased by more than 10%. And $Fe^{+3}$ concentration decreased by more than 10%.

If the reactor was not at steady state or at washout, it was said to be in transition. This occurred whenever a set point was changed and the conditions for the other two states had not been met.

Residence time is the amount of time it takes for the volume of liquid within the reactor to be completely replaced. The residence time is the reciprocal of the dilution rate. The dilution rate, D, of the bioreactor expressed in $$\frac{1}{hr}$$

is defined as:

$$\text{Flow} \frac{\text{Rate}}{\text{Volume}}$$

of the bioreactor. For example, the bioreactor used in this study had a working volume of approximately 1360 $ml$.

For a flow rate of $$420 \frac{ml}{hr}$$

the dilution rate would be $$.3088 \frac{1}{hr}.$$

Thus, the residence time $$\left(\frac{1}{D}\right)$$

for this example is 3.2 hours.

Results of Flow Rate Control

The bioreactor was operated using the learning-based control algorithm. The control decisions were made by the Supervisory Control System, which varied the values of pH, temperature, and iron concentration. As described above, steady state was defined as: Eh values, $Fe^{2+}$ and $Fe^{3+}$ concentrations, and cell numbers do not vary more than 10%, with total iron concentrations being within 5% of the set point. The weighting function for productivity was f=1, which optimized the productivity of the bioreactor for iron oxidation per unit time, see Equation 22.

The bio reactor was inoculated and operated in batch mode for approximately 1 day during which time biomass reached a cell density of $$2.7 \times 10^7 \frac{\text{cells}}{ml}.$$

The bioreactor was operated in the continuous flow mode for a period of approximately 200 days (see FIG. 8) using the sets of conditions and the flow rates listed in Table III. Except when noted, the values reported for suspended cell density, $Fe^{3+}$, and production $$\frac{ml}{min}$$

are the values obtained when the bio reactor was operated at the flow rate that achieved the maximum iron production for that set of conditions.

Figure 9:
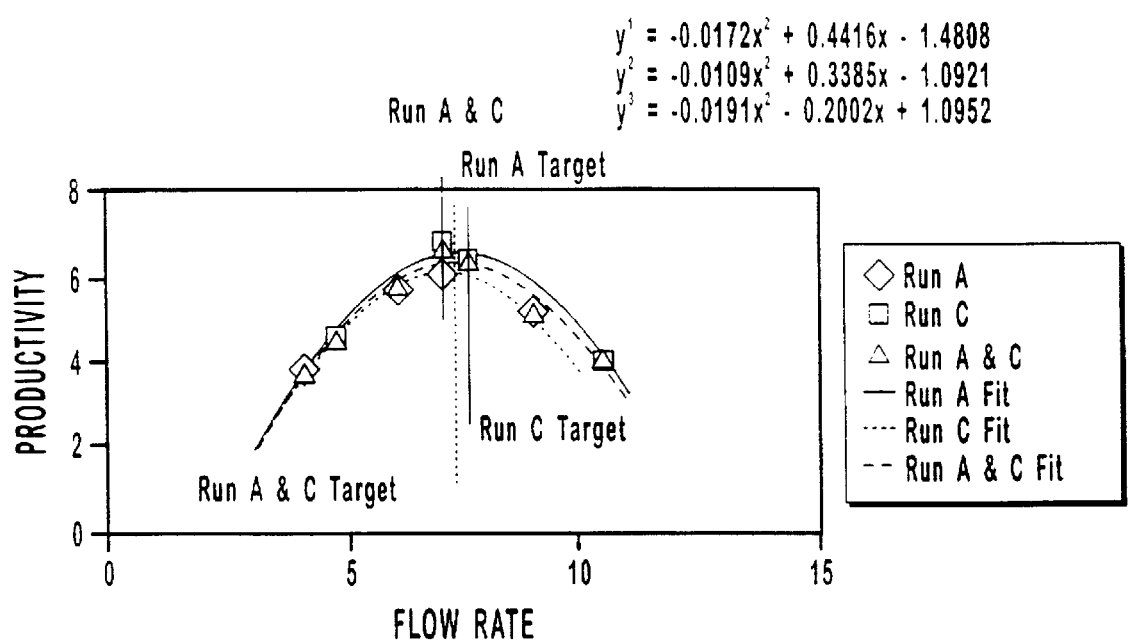
FIG. 9 illustrates a selected function for the flow rate optimization algorithm for flow rate choices for runs A & C described in Table III given below, according to the inventive method.

For Run A (pH 1.8; 45° C.; 50 mM $Fe^{2+}$) productivity data for flow rates of 4, 6, and $$9 \frac{ml}{min}$$

were fitted to a polynomial and used predict that a flow of $$7.01 \frac{ml}{min}$$

would result in optimum productivity (FIG. 9).

TABLE III

Effects of Multi-Parameteric Changes on the Growth and Iron Oxidation by the Newmont Moderately Thermophilic Culture.

| | Parameter Set | | | | Values at Maximum Productivity | | | |
|---|---|---|---|---|---|---|---|---|
| | | | | Flow Rates | Biomass | | | Productivity |
| Run | °C. | pH | Inlet Iron (mM) | $\frac{ml}{min}$ | $\frac{cells}{ml}$ | $Fe^{3+}$ | $Fe^{2+}$ | $\frac{mL}{min}$ |
| A | 45 | 1.8 | 50 | 4, 6, 9, 7.03* | $7.6 \times 10^7$ | 45.08 | 6.95 | 6.31 |
| B | 51.5 | 1.84 | 47.15 | 7, 2* | $2.91 \times 10^5$ | 4.24 | 40 | 0.19 |
| C | 45 | 1.8 | 50 | 7, 4.67, 10.5, 7.45* | $7.33 \times 10^7$ | 42.88 | 8.7 | 6.193 |
| D | 40.7 | 1.9 | 34.48 | 7.45, 4.93, 11.1, 12, 11.2* | $1.62 \times 10^7$ | 16.28 | 18.9 | 5.183 |
| E | 53.3 | 1.64 | 60.65 | 11.1, 7.4, 12, 9.6* | Incomplete Run - No Data | | | |
| F | 53.3 | 1.64 | 60.65 | 4.5, 7.5, 11.25, 9.17, 12, 8.52* | $2.98 \times 10^7$ | 35.56 | 26.4 | 4.891 |
| G | 39.7 | 2.3 | 45.5 | 8.55, 5.73, 12, 12.75**, 15.4, 21 | $2.28 \times 10^7$ | 5.4 | 42.5 | 1.4 |
| H | 39.9 | 1.7 | 39.94 | 5.2, 7.8, 11.7, 9.19* | $3.14 \times 10^7$ | 22.74 | 12.9 | 6.32 |

*Values obtained at the flow rate for which maximum productivity was achieved.

$12.75 \frac{ml}{min}$

**Liquid feed system unable to deliver calculated flow rate. Values are for flow rate of.

This flow rate was validated by the final run of $$7 \frac{ml}{min}.$$

There was no curve fitting procedure for Run B (pH 1.84, 51.5° C., 47.15 mM $Fe^{2+}$) which was terminated by the operator due to washout even at the lower flow rate of $$2.0 \frac{ml}{min}.$$

Figure 8:
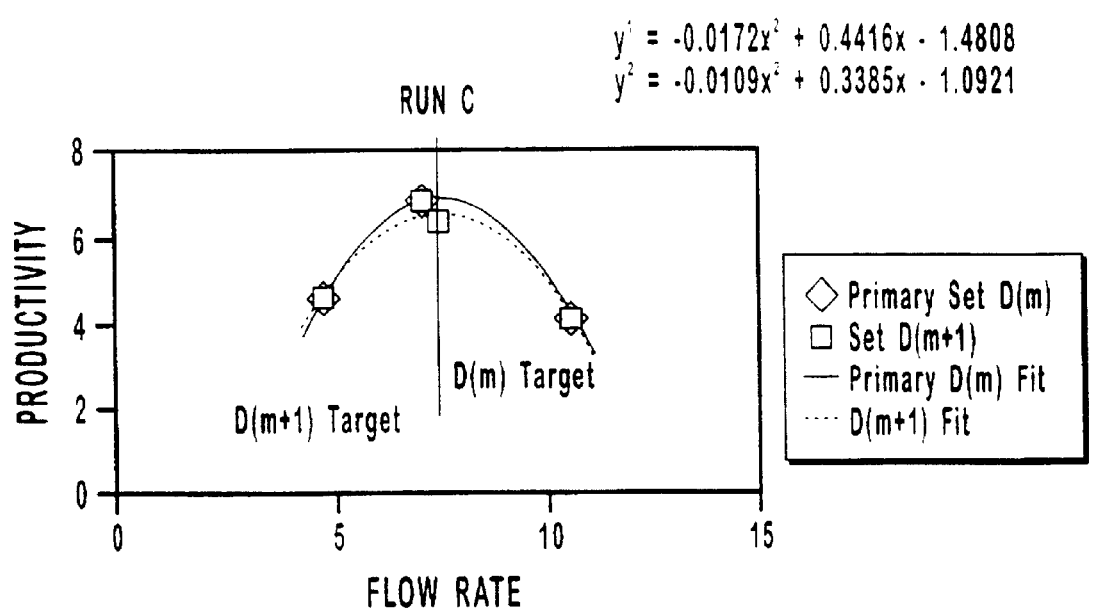
FIG. 8 illustrates a selected function for the flow rate optimization algorithm for flow rate choices for run C described in Table III given below, according to the inventive method.

Run C (pH 1.8, 45° C. from near washout conditions (see FIG. 8). The comparison of data obtained for runs A and C (see FIG. 9) indicated there was a consistency in the behavior of the chemostat in spite of the fact that the microorganisms were subjected to an adverse set of parameters.

During Run D, the computer had predicted that maximum productivity would occur at $$11.2 \frac{ml}{min}$$

Figure 10:
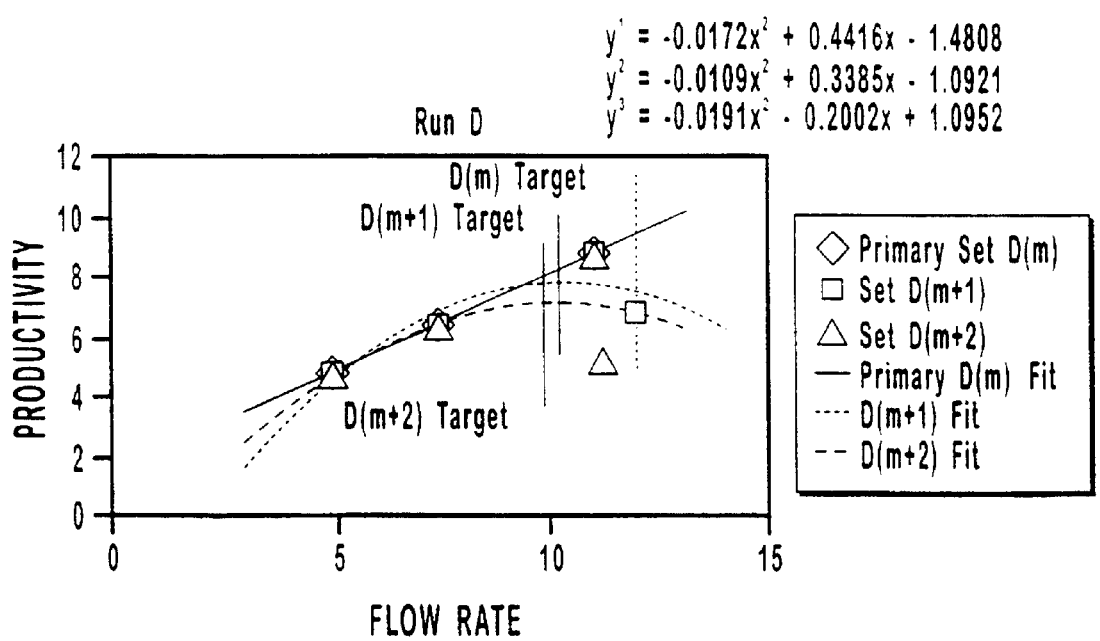
FIG. 10 illustrates a selected function for the flow rate optimization algorithm for flow rate choices for run D described in Table III given below, according to the inventive method.

(see FIG. 10). The final productivity for this run was a value of 5.183 instead of 8.5 that was achieved at a flow rate of $$11.1 \frac{mls}{min}.$$

Nevertheless, because the final curve fitting procedure using the complete set of data had a optimal flow rate that was comparable to the one that was predicted (11.2 mls), the data set was considered validated and the computer selected the next set of parameters to evaluate.

Figure 11:
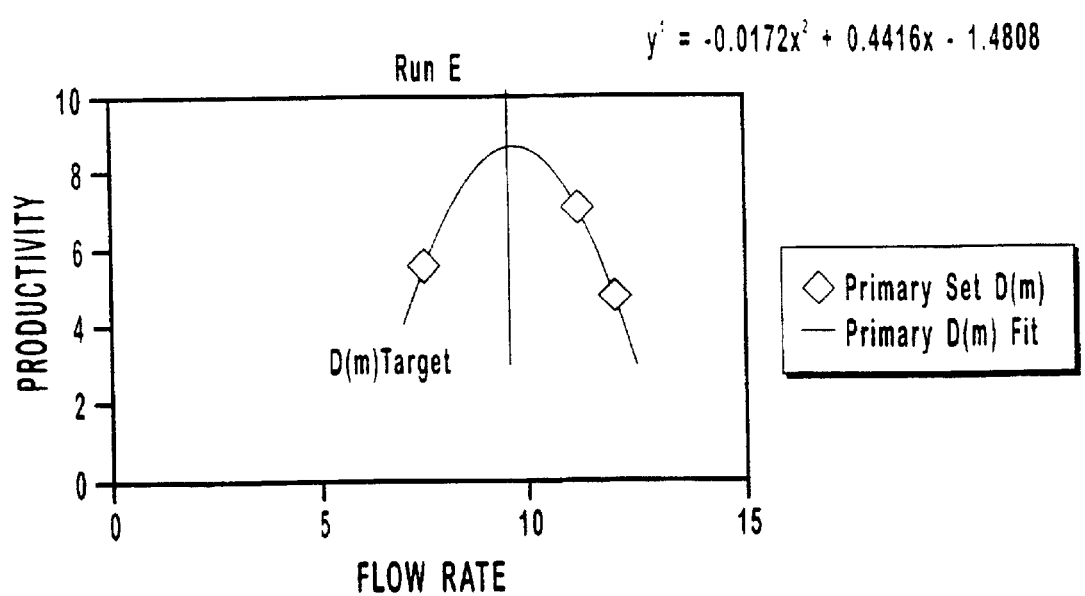
FIG. 11 illustrates a selected function for the flow rate optimization algorithm for flow rate choices for run E described in Table III given below, according to the inventive method.
Figure 12:
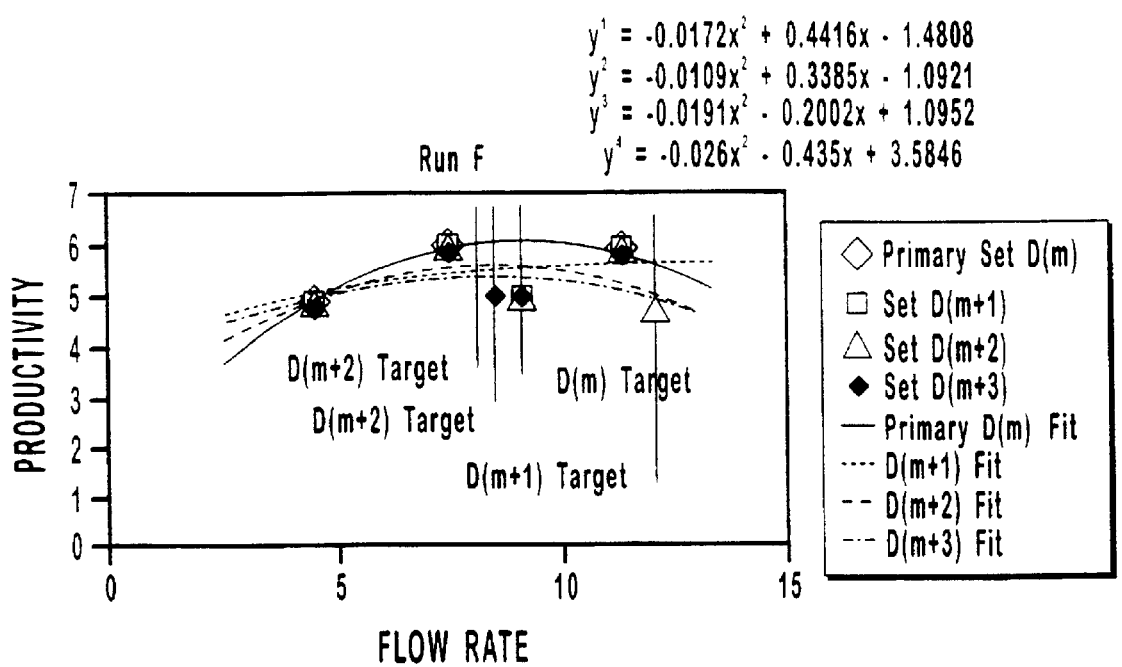
FIG. 12 illustrates a selected function for the flow rate optimization algorithm for flow rate choices for run F described in Table III given below, according to the inventive method.

Run E (see FIG. 11) was not completed due to a malfunction in the hard drive the computer. During Run F (see FIG. 12), the computer required 6 flow rates to select and validate the maximum productivity. A rather shallow curve was obtained that did not have a strong maximum. Comparable productivity values were obtained at the similar flow rates that were evaluated in both Runs E and F.

Figure 13:
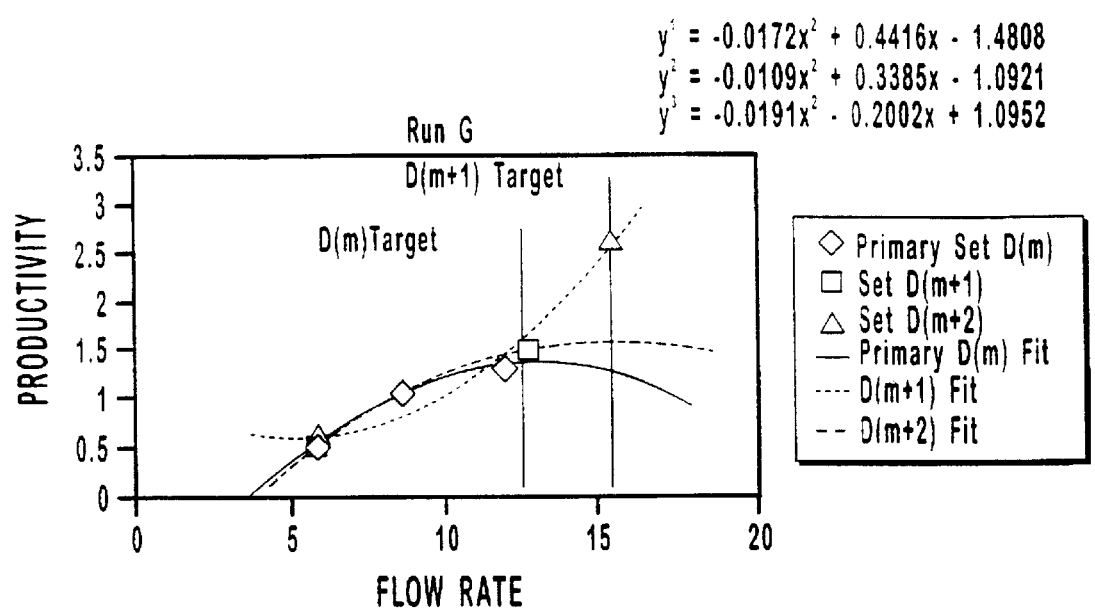
FIG. 13 illustrates a selected function for the flow rate optimization algorithm for flow rate choices for run G described in Table III given below, according to the inventive method.

Run G (see FIG. 13) illustrated the difficulty the control system encountered when evaluating a set of parameters (pH 2.3, 39.7° C. and 45.5 mM iron) that resulted in poor productivity. In this example, the overall conversion of $Fe^{2+}$ to $Fe^{3+}$ was so low that productivity could only be improved by increasing flow rate. Because of the shape of the curve, the BioExpert was unable to determine a flow rate at which maximum productivity was achieved based on the programmed curve fitting procedure. The run was terminated by the human operators because requested flow rates had exceeded the pumping capacity of the small tubing that was installed in the peristaltic pumps. Nevertheless, for purposes of discussion and comparison to other runs, the data obtained at the flow rate of 12.75 was utilized.

Figure 14:
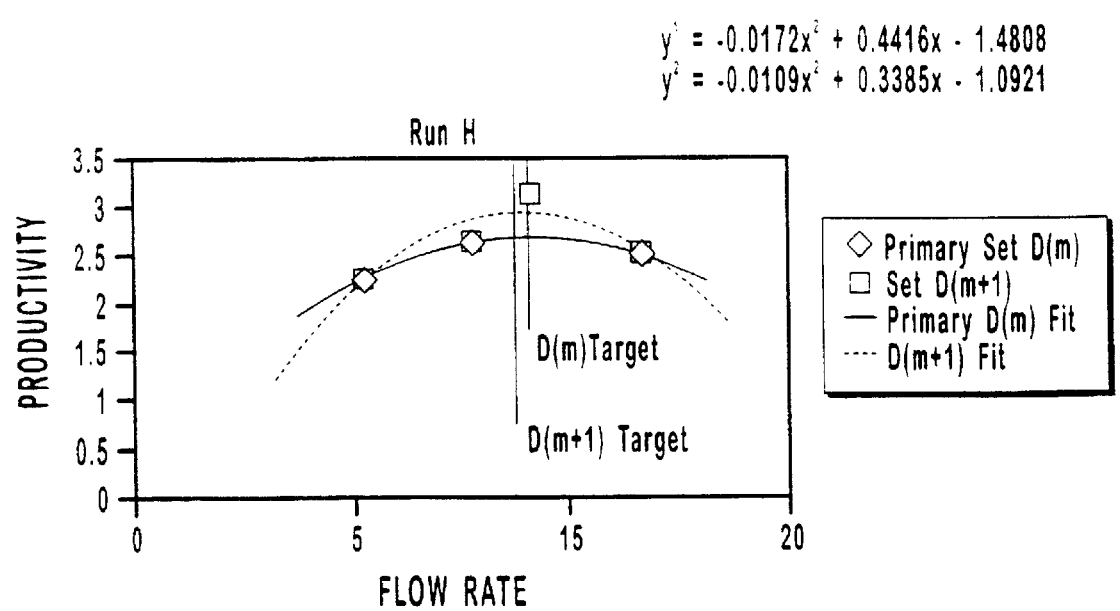
FIG. 14 illustrates a selected function for the flow rate optimization algorithm for flow rate choices for run H described in Table III given below, according to the inventive method.
Figure 15A:
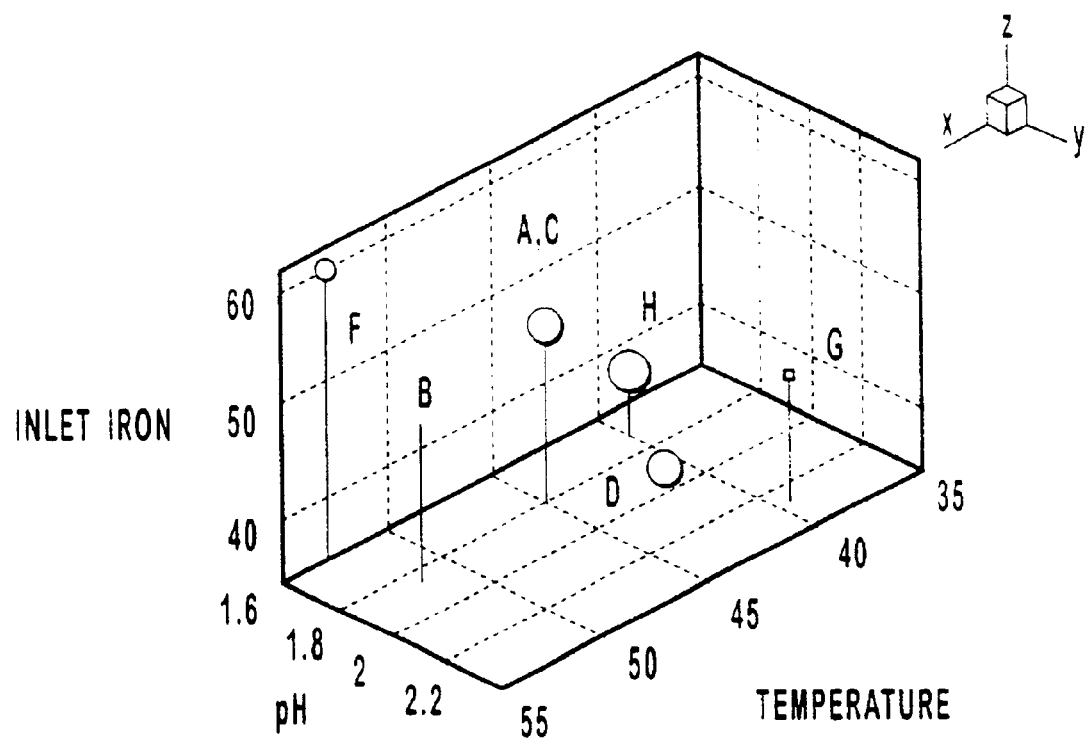
FIG. 15A: The continuous space plot has been positioned to allow viewing of the data with respect of temperature (X-axis), pH (Y-axis) and inlet iron concentration (Z-axis).
Figure 15B:
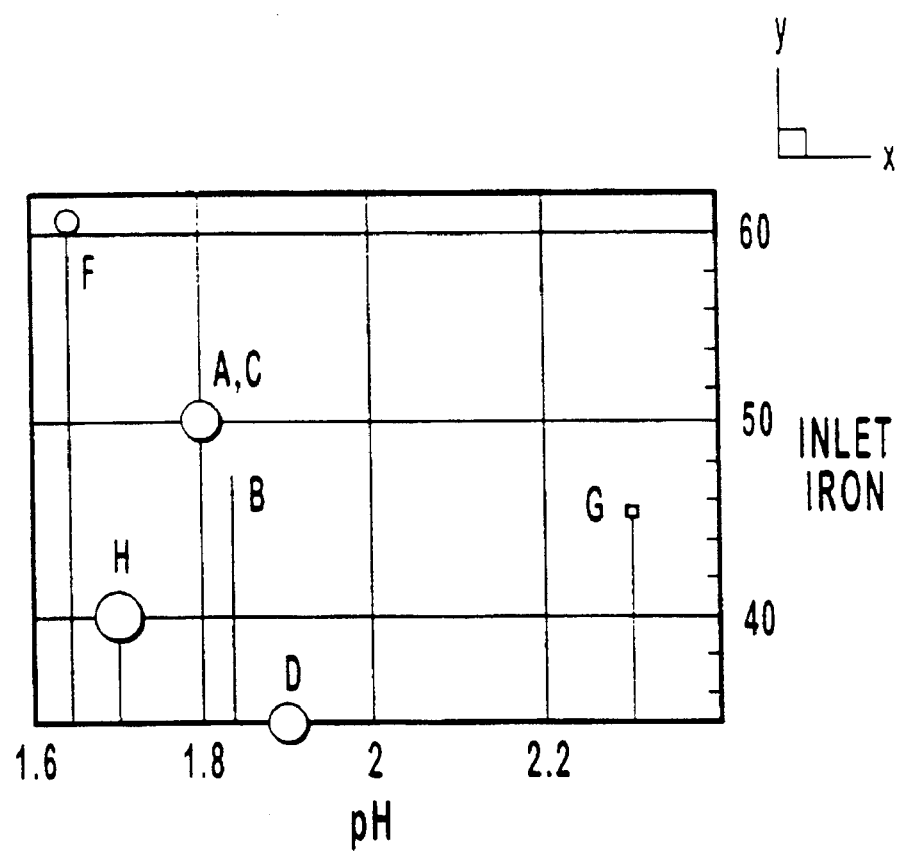
FIG. 15B: The continuous space plot has been rotated to provide a top-down view which emphasizes the data in relation to inlet iron (Z-axis) and pH (Y-axis).
Figure 15C:
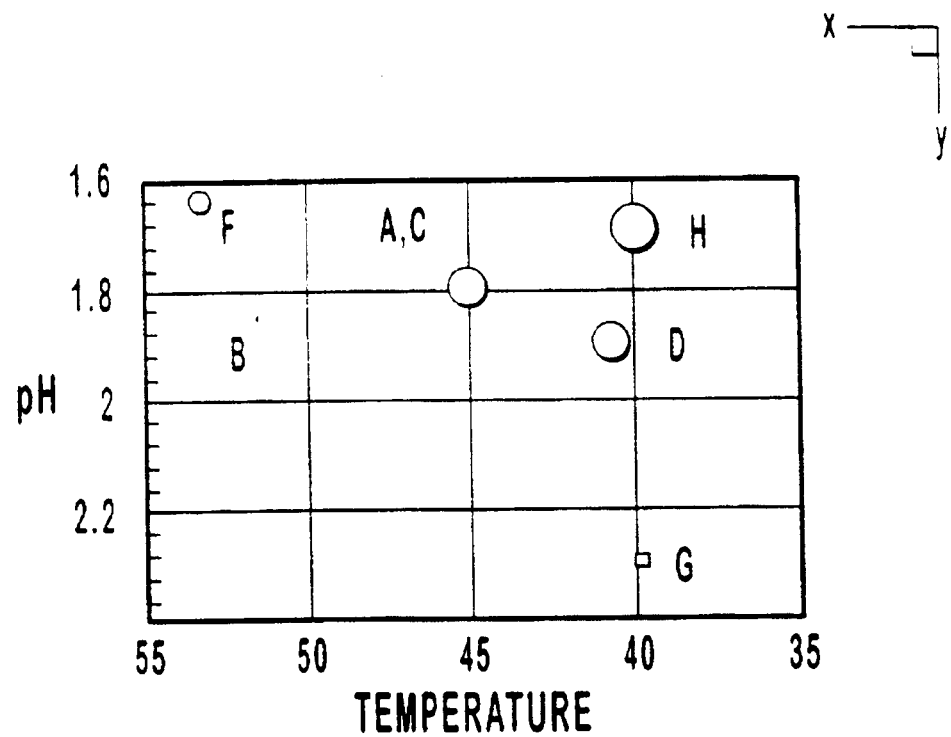
FIG. 15C: The continuous space plot has been rotated to provide a top-down view which emphasizes the data in relation to temperature (X-axis) and pH (Y-axis).
Figure 15D:
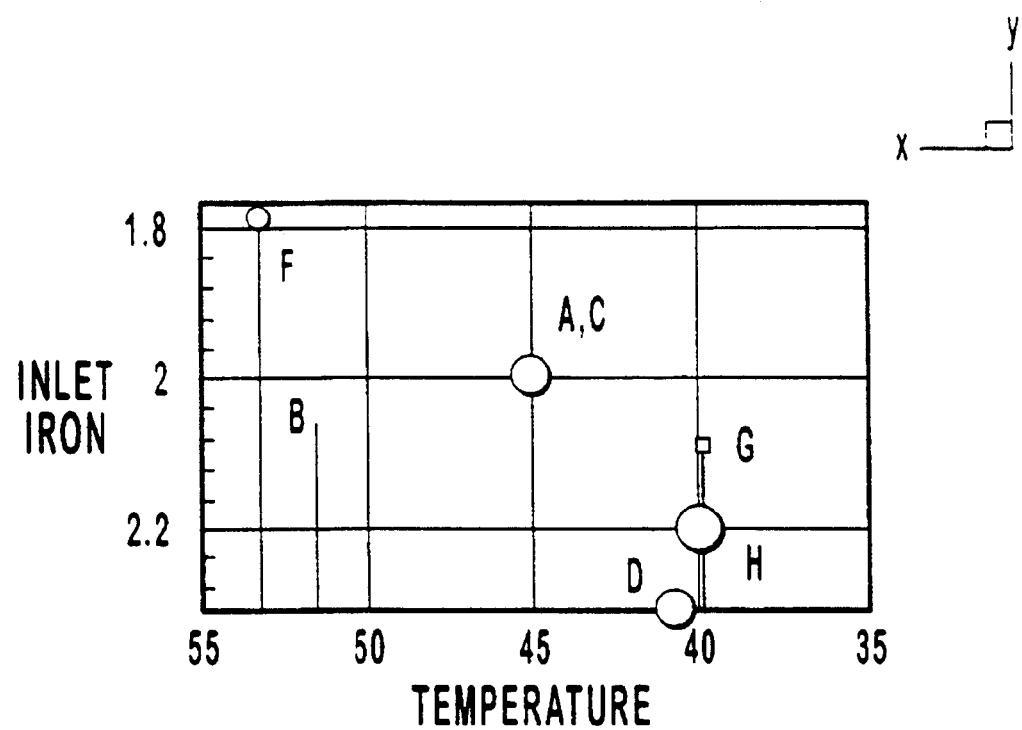
FIG. 15D: The continuous space plot has been rotated to provide a side view which emphasizes the data in relation to inlet iron concentration (Z-axis) and the temperature (X-axis).
Figure 16A:
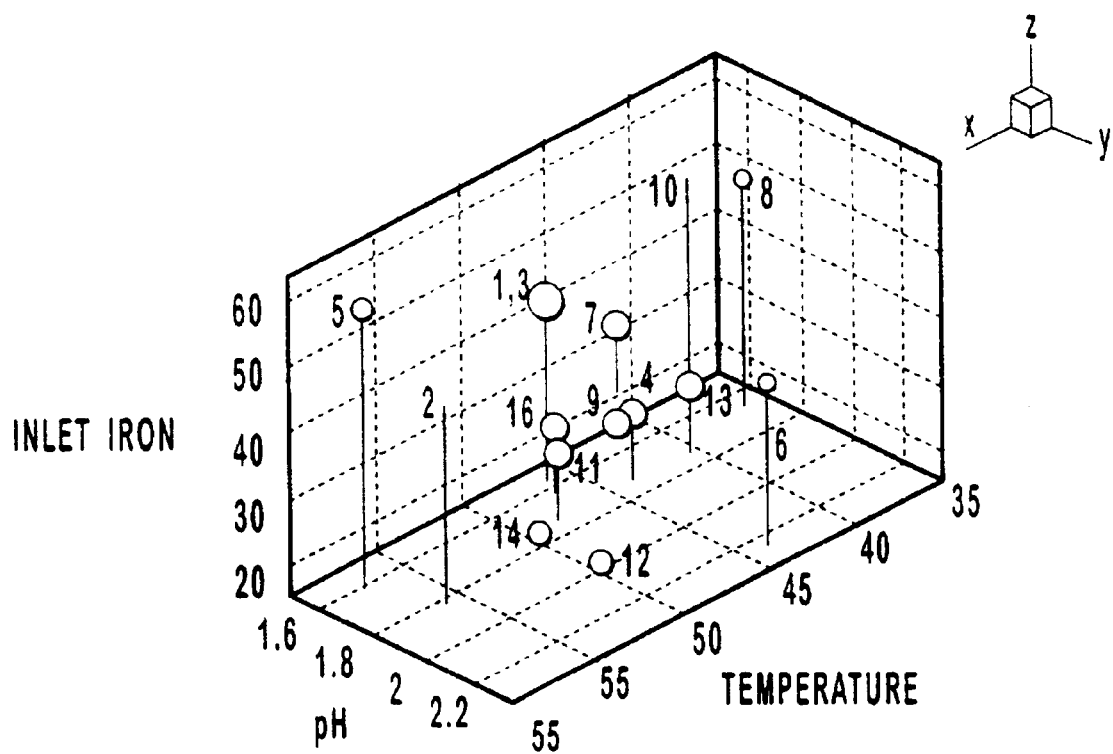
FIG. 16A: The continuous space plot has been positioned to allow viewing of the data with respect of temperature (X-axis), pH (Y-axis) and inlet iron concentration (Z-axis).
Figure 16B:
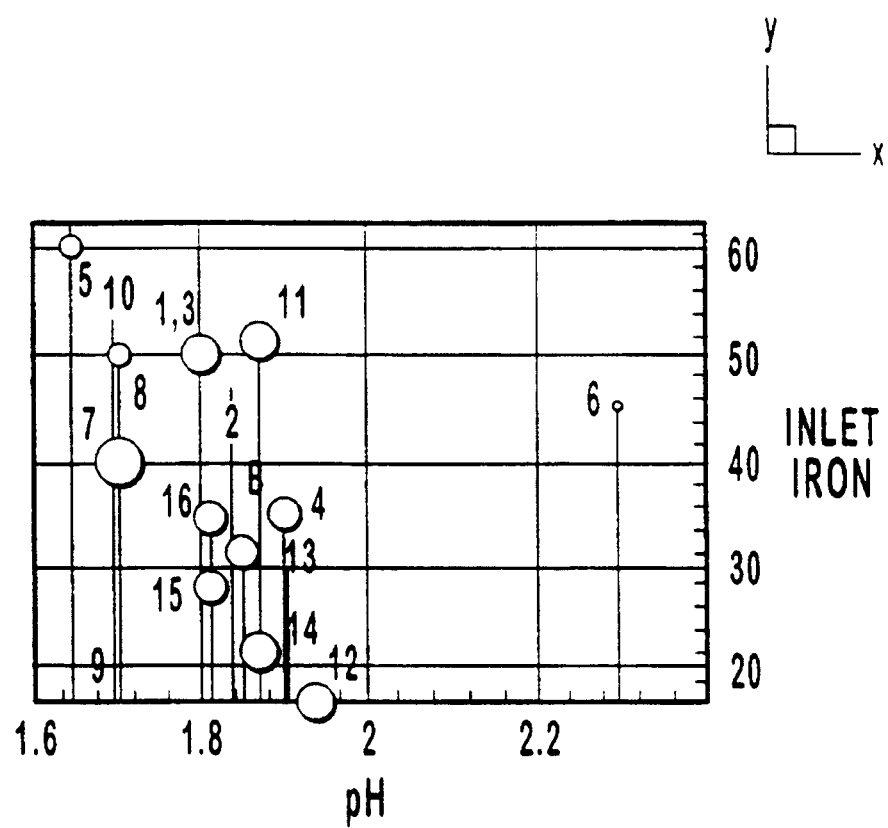
FIG. 16B: The continuous space plot has been rotated to provide a top-down view which emphasizes the data in relation to inlet iron (Z-axis) and pH (Y-axis).
Figure 16C:
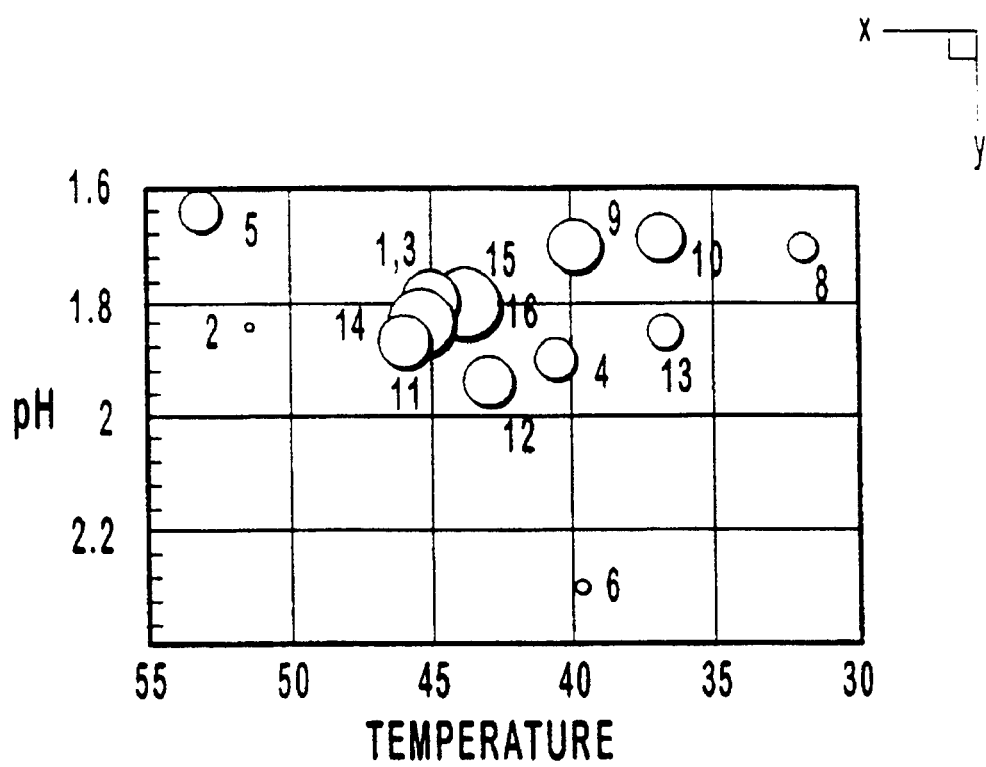
FIG. 16C: The continuous space plot has been rotated to provide a top-down view which emphasizes the data in relation to temperature (X-axis) and pH (Y-axis).
Figure 16D:
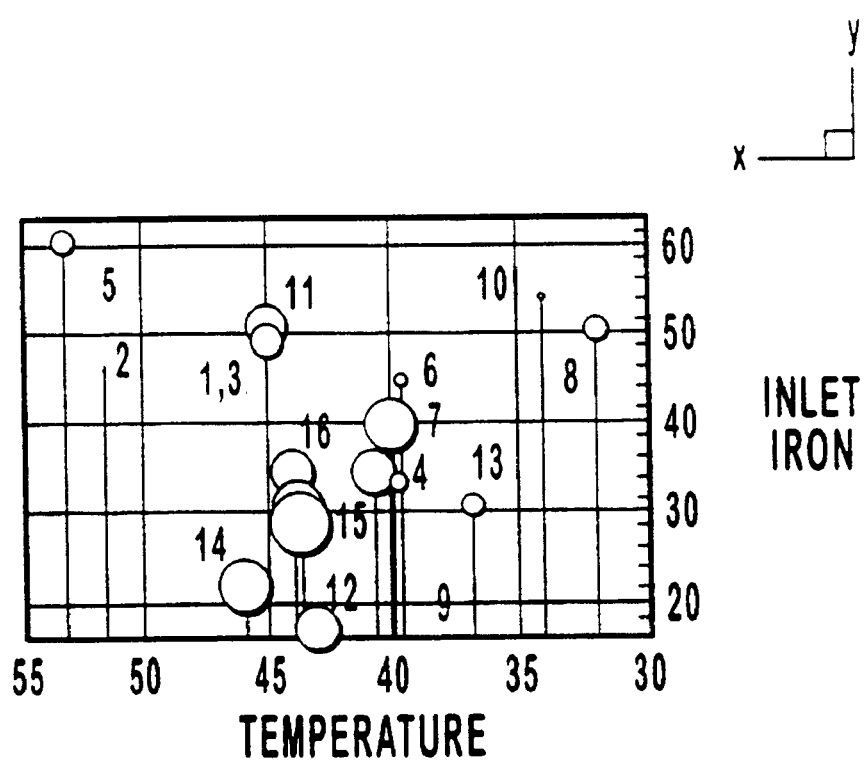
FIG. 16D: The continuous space plot has been rotated to provide a side view which emphasizes the data in relation to inlet iron concentration (Z-axis) and the temperature (X-axis).

The behavior of the reactor in Run H (see FIG. 14), was such that the maximum productivity was easily predicted and validated according to the programmed procedure. The maximum productivity data for Runs A–H are plotted in a 3-dimensional figure in which the X, Y, and Z axes are the pH, temperature and inlet iron concentrations, see FIG. 15. The maximum productivity for that run is indicated by coloration or the size of the sphere.

Results of Learning-Based Control

A learning-based supervisory control system, such as the one described herein, would be applicable for any bioprocess for which there is little a priori information, such as the problem selected for this study. Little was known about this iron-oxidizing culture other than it was "enriched" from a sample acquired from a heap leaching operation by cultivation at 55° C. in an acidic (pH 1.8) medium containing yeast extract and $Fe^{2+}$. To acquire some expert knowledge about the behavior of this culture, the bioreactor was operated with the control decisions made by the human operator, i.e., change in flow rate and change in temperature, with steady state determinations using the intelligent control system's criteria. This information was used to set the allowable environmental range used within the stochastic learning algorithm, e.g. the maximum allowed pH. Such general limits are used to protect the bacteria from an assumed killing environment. Similar limits are used on more traditional control systems. For example, aircraft have a maximum allowed acceleration, which corresponds to a maximum G-force, that a structure may experience before structural failure occurs.

The interaction of the BioExpert software module with the BioController software module was comparable to other hierarchical systems that have been described in the literature. Due to the settling times for the system and the iterative approach to finding the optimal flow rate for each environmental parameter set, a considerable amount of time was required for each step of the stochastic learning algorithm. Consequently, it required approximately six to seven months to evaluate the full controllers eight environmental parameter sets discuss within this paper, see Table III. Another set of runs, runs 16–24 in Table IV, was completed in a much shorter time period using the isolated stochastic learning control system by operating the system without the flow rate optimization sub-controller. The flow rate controller was set to $$7 \frac{ml}{min}.$$

Figure 17:
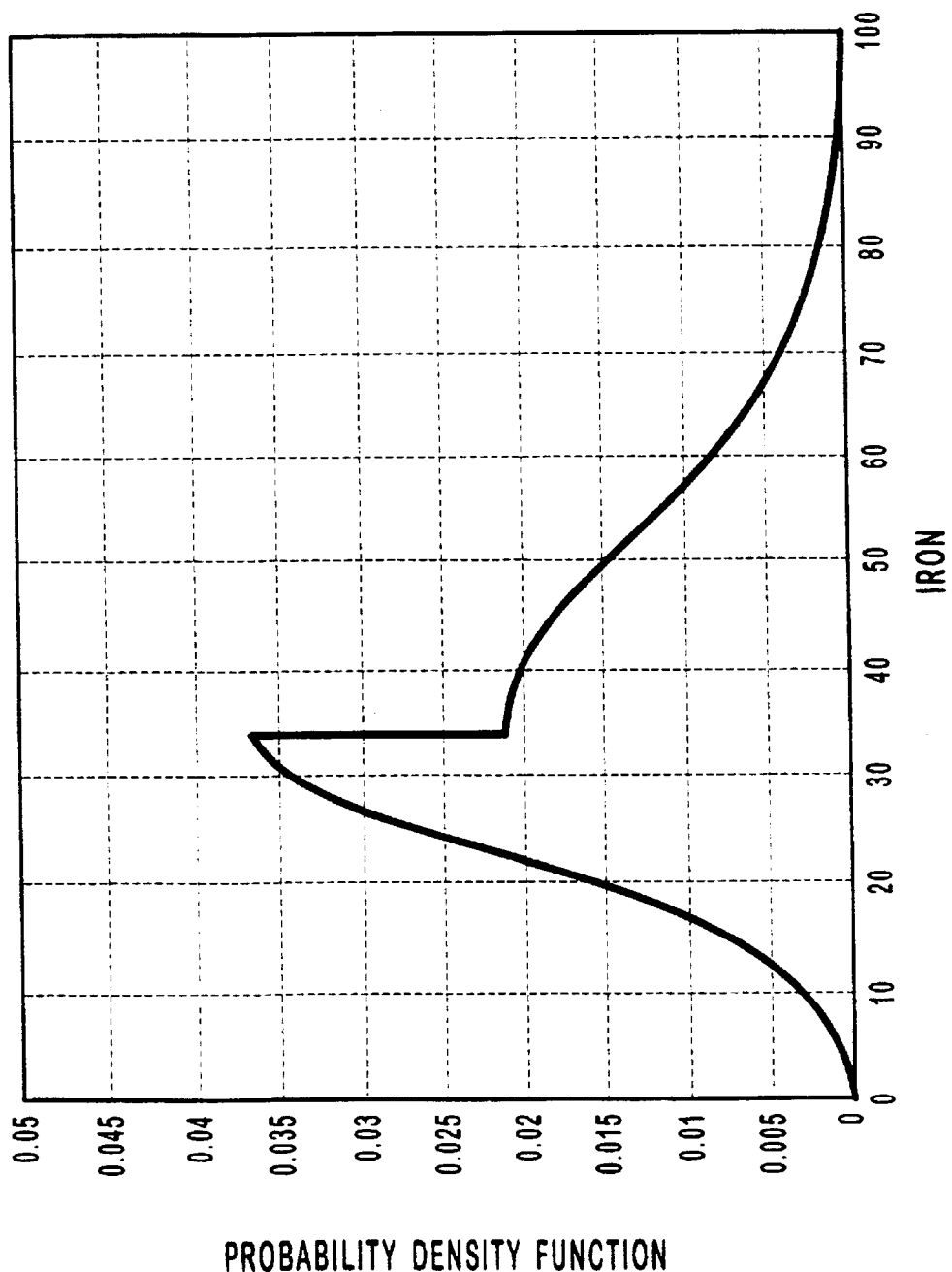
FIG. 17 illustrates a typical probability distribution function that demonstrates use of the inventive stochastic learning algorithm, where an iron concentration decrease did not improve productivity, hence the mean was not changed, the upper limit was not changed, and the lower limit was increased.

The results shown in FIG. 15 for the combined stochastic and flow rate optimization control system show that the assumption of coupled environmental parameters is correct. This is an important result, since the biological community tend to assume the decoupling of the environmental parameters as they investigate a new bacterium. In order to speed the decision making process, as was mentioned above, the flow rate optimization controller was turned off, the productivity space for this series of stochastic choices is shown in FIG. 16. A typical probability distribution function for this series within the stochastic learning algorithm is shown in FIG. 17. It can be shown through examples that over time the stochastic learning algorithm's distribution functions practical support, shrink to approximate delta-dirca functions. Once this occurs, the local maximum productivity for the bioprocess has been found. Although the data presented to date is not over a sufficient length of time for the distribution functions to shrink completely to a delta-dirca function, it is clear that the controller was progressing in that direction.

Illustrative Examples of the Algorithm

The present invention may be illustrated by three examples. In a first example, an input parameter is increased and a selected output or process goal is improved, or the selected output parameter or process goal is not improved. In a second example, an input parameter is decreased and a selected output parameter or process goal is improved, or it is not improved. In a third example, an input parameter is generically changed and a selected output parameter or process goal is improved, or it is not improved In the first example, a split Gaussian data distribution is established, by way of non-limiting illustration, for temperature, T. The split Gaussian data distribution has a mean of $T_0$, a standard deviation, an upper limit, and a lower limit. The system is run for a time period and a first measuring is taken on an output variable, by way of non-limiting illustration, for $Fe^{3+}$. Next, the value of the temperature is changed from the mean, $T_0$, to a new amount, $T_1$ to create a difference: $T_1-T_0$. Next, a second measuring is taken on the same output variable, $Fe^{3+}$. If the output variable is improved, (i.e. increased), the mean, $T_0$, is changed to $T_1$. The upper limit is changed by a first amount, and the lower limit is changed by the difference: $T_1-T_0$. The change of the upper limit by the first amount is greater than $T_1-T_0$. The area under the Gaussian curve remains nominally equal to unity. If the output variable is not improved, then the mean, $T_0$, is not changed, the upper limit is decreased by an amount proportional to $T_1-T_0$, and the lower limit is not changed.

In the second example, the input variable, $T_0$, is decreased to $T_1$ and the output variable or process goal (e.g. $Fe^{3+}$) is improved, or the output or process goal is not improved. The

TABLE IV

Effects of Multi-Parametric Changes on the Growth and Iron Oxidation by the Newmont Moderately Thermophilic Culture (Near Constant Flow Rate).

| | Parameter Set | | | | Values at Steady State | | | | | |
|---|---|---|---|---|---|---|---|---|---|---|
| Run | ° C. | pH | Inlet Iron (mM) | Flow Rate $\frac{ml}{min}$ | Biomass × 10⁶ Cells $\frac{}{ml}$ | $Fe^{3+}$ (mM) | $Fe^{2+}$ (mM) | $Fe^{3+}/Fe^{2+}$ | % Iron Oxidized | Productivity $\frac{ml}{min}$ |
| 1 | 40 | 2 | 50 | 7 | 9.9 | 21.96 | 29.20 | 0.75 | 42.9 | 3.005 |
| 2 | 30 | 2 | 50 | 7 | 4.71 | 19.66 | 32.33 | 0.61 | 37.8 | 2.647 |
| 3 | 50 | 2 | 50 | 7 | 18.7 | 23.64 | 26.60 | 0.89 | 47.1 | 3.294 |
| 4 | 45 | 2 | 50 | 7 | 14.2 | 19.94 | 31.00 | 0.64 | 39.1 | 2.740 |
| 5 | 55 | 2 | 50 | 7 | 21.2 | 20.74 | 29.80 | 0.70 | 41.0 | 2.873 |
| 6 | 60 | 2 | 50 | 7 | 1.7 | 12.22 | 38.20 | 0.32 | 24.2 | 1.697 |
| 7 | 45 | 1.8 | 50 | 7.03 | 76 | 45.08 | 6.95 | 6.49 | 86.6 | 6.091 |
| 8 | 45 | 1.8 | 50 | 7 | 105 | 48.8 | 2.10 | 23.24 | 95.9 | 6.711 |
| 9 | 51.5 | 1.84 | 47.15 | 7 | 4.4 | 10.27 | 37.75 | 0.27 | 21.4 | 1.497 |
| 10 | 45 | 1.8 | 50 | 7 | 82.9 | 43.12 | 8.40 | 5.13 | 83.7 | 5.859 |
| 11 | 45 | 1.8 | 50 | 7.45 | 73.3 | 42.88 | 8.70 | 4.93 | 83.1 | 6.193 |
| 12 | 40.7 | 1.9 | 34.48 | 7.4 | 29 | 27.7 | 6.15 | 4.50 | 81.8 | 6.065 |
| 13 | 53.3 | 1.64 | 60.65 | 7.4 | 85.1 | 46.36 | 14.25 | 3.25 | 76.5 | 5.660 |
| 14 | 53.3 | 1.64 | 60.65 | 7.5 | 70.4 | 48.32 | 15.25 | 3.17 | 76.0 | 5.701 |
| 15 | 39.9 | 1.7 | 39.94 | 7.8 | 31.5 | 26.92 | 14.38 | 1.87 | 65.2 | 5.084 |
| 16 | 32 | 1.7 | 50 | 7 | 35.8 | 22.04 | 29 | 0.76 | 43.2 | 3.023 |
| 17 | 38.7 | 1.69 | 17.14 | 7 | 2.13 | 0.769 | 17 | 0.05 | 4.3 | 0.303 |
| 18 | 34 | 1.69 | 53.61 | 7 | 1.0 | 2.45 | 52 | 0.05 | 4.5 | 0.315 |
| 19 | 45 | 1.87 | 51.33 | 7 | 66.5 | 32.28 | 18.88 | 1.71 | 63.1 | 4.417 |
| 20 | 43 | 1.94 | 16.82 | 7 | 54.7 | 14.19 | 1.8 | 7.88 | 88.7 | 6.212 |
| 21 | 36.8 | 1.85 | 31.05 | 7 | 23 | 16.14 | 15.50 | 1.04 | 51.0 | 3.571 |
| 22 | 45.9 | 1.87 | 21.74 | 7 | 83.8 | 20.66 | 1.38 | 15.03 | 93.8 | 6.563 |
| 23 | 43.6 | 1.8 | 28.9 | 7 | 45.9 | 27.04 | 1.53 | 17.73 | 94.7 | 6.626 |
| 24 | 44 | 1.81 | 34 | 7 | 44.8 | 34.2 | 1.43 | 24 | 96.0 | 6.720 | split Gaussian data distribution is the same initially as in the first example. The system is run for a time period and a first measuring is taken on an output variable, $Fe^{3-}$. Next, the value of the temperature is changed from the mean $T_0$ to a new amount, $T_1$ to create a difference: $T_0-T_1$. Next, a second measuring is taken on the same output variable, $Fe^{3+}$. If the output variable is improved (e.g. $Fe^{3+}$ is increased), the mean, $T_0$, is changed to $T_1$. The lower limit is changed by a first amount, and the upper limit is changed by the difference: $T_0-T_1$. The change of the lower limit by the first amount is greater than the difference of $T_0-T_1$. The area under the split Gaussian curve remains nominally equal to unity, however. If the output variable is not improved, then the mean, $T_0$, is not changed. The lower limit is decreased by an amount proportional to $T_0-T_1$, and the upper limit is not changed.

The third example is generic as to the direction of change of the input variable and as to the type of data distribution that is used. In this third example, a method of controlling a system is provided by establishing a split data distribution for at least one input variable T, the split data distribution has a mean of $T_0$, a standard deviation, an upper limit, and a lower limit. The system is run for a period of time and first measuring is taken for the at least one output variable. The value of the input variable, T, is changed from the mean, $T_0$ to a new value, $T_1$ to create a difference: $|T_0-T_1|$. A second measuring of the at least one output variable is taken. If the output variable is improved, the mean input variable, $T_0$ is changed to $T_1$, the upper limit of the data distribution is changed, and the lower limit of the data distribution is changed. The limit that is approached by the direction of the difference between $T_0$ and $T_1$ is changed more than the limit that is distanced by the difference between $T_0$ and $T_1$. If the output variable is not improved, then the mean, $T_0$ is not changed, the limit that is approached by the direction of the difference between $T_0$ and $T_1$ is changed by decreasing it proportional to $|T_0-T_1|$, and the limit that is distanced by the difference between $T_0$ and $T_1$ is not changed.

Concluding Embodiment Remarks

In summary, the importance of proper control of multi-parametric effects on the growth and iron-oxidation by acidophilic, moderately thermophilic bacteria was demonstrated according to the inventive method. The standard assumption made in biological experimentation is that the biological controls, i.e. the environmental parameters, are decoupled. This assumption allows for the search of an optimal production environment through the mapping of the data space one parameter at a time. This control system was designed around the opposite assumption; primarily that the biological controls are coupled. Through the testing of this system, it has been shown that coupled parameters is the only plausible assumption that can be made for this biological system.

The current implementation of this invention appeared to function as desired. Moreover, this reactor and control system provided a valuable real world means for testing new and improved control system concepts in model less environments. This control system serves as an example of what the microbiological research teams currently need for studying newly discovered uncharacterized microorganisms.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

We claim:

1. A method of controlling a bioreactor comprising:
   establishing in an expert controller a split data distribution for at least one input variable, the split data distribution having a mean of N and a standard deviation, an upper limit, and a lower limit;
   running the bioreactor according to the at least one input variable as controlled by a biocontroller and first measuring at a diagnostic system at least one output variable from the reactor;
   changing in the expert controller a value of the at least one input variable from the mean to a new input variable value, N+1, to create a difference (N+1)−N;
   running the bioreactor according to the value of the it least one input variable as controlled by the biocontroller and second measuring at the diagnostic system the at least one output variable from the bioreactor, and if the at least one output variable is improved, in the expert controller:
   changing the mean of the at least one input variable to the new input variable value, N+1;
   changing the upper limit; and
   changing the lower limit, wherein a one of the upper and lower limit that is approached by the direction of the difference is changed more than a one of the upper and lower limit that is distanced by the direction of the difference; and
   if the at least one output variable is not improved, in the expert controller:
   not changing the mean of the at least one input variable;
   changing a one of the upper and lower limit that is approached by the direction of the difference by decreasing it; and
   not changing a one of the upper and lower limit that is distanced by the direction of the difference.

2. The method of controlling a bioreactor according to claim 1, wherein when the at least one output variable comprises a plurality, the plurality including product productivity, $P_{product}$, and biomass density, $P_{biomass}$, further comprising:
   ascribing a relationship between the product productivity and the biomass density according to $P=f(P_{product})+(1-f)(P_{biomass})$,
   wherein P is overall process productivity and f is a weighting factor in a range from 0 to 1.

3. The method of controlling a bioreactor according to claim 2 wherein the weighting factor, f, is varied comprising:
   when a present productivity of a first product is greater than its previous maximum productivity, then the weighting factor is increased;
   but when the weighting factor, as increased, is greater than 1, then the weighting factor is equal to 1;
   when the present productivity of the first product is not greater than its previous maximum productivity, the weighting factor is decreased;
   when a present productivity of a second product is greater than its previous maximum productivity, then the weighting factor is decreased;
   when the present productivity of the second product is not greater than its previous maximum productivity, the weighting factor is increased;
   but when the weighting factor is greater than 1, then the weighting factor is equal to 1; and
   repeating the method at least once, wherein the weighting factor is a highest retained value thereof.

4. The method of controlling a bioreactor according to claim 1, wherein changing the value of the at least one input variable includes ascribing a random value thereto within a predetermined range.

5. The method of controlling a bioreactor according to claim 1, wherein one of the at least one input variable is pH.

6. The method of controlling a bioreactor according to claim 4, wherein the predetermined range is determined by selecting at least one microorganism and determining a pH range within which the at least one microorganism will remain viable.

7. The method of controlling a bioreactor according to claim 1, wherein one of the at least one input variable is temperature.

8. The method of controlling a bioreactor according to claim 4, wherein the predetermined range is determined by selecting at least one microorganism and determining a temperature range within which the at least one microorganism will remain viable.

9. The method of controlling a bioreactor according to claim 1, wherein one of the at least one input variable is microorganism flow rate.

10. The method of controlling a bioreactor according to claim 4, wherein the predetermined range is determined by selecting at least one microorganism and determining a microorganism flow rate range within which the at least one microorganism will resist reactor washout.

11. The method of controlling a bioreactor according to claim 1, wherein changing the value of the at least one input variable includes ascribing a random value thereto.

12. A method of controlling a reactor comprising:
 establishing in an expert controller a split data distribution for at least one input variable, the split data distribution having a mean of N, a standard deviation, an upper limit, and a lower limit;
 running the reactor according to the at least one input variable as controlled by a biocontroller and first measuring at a diagnostic system at least one output variable;
 increasing in the expert controller a value of the at least one input variable from the mean to a new input variable value, N+1;
 running the reactor according to the value of the at least one input variable as controlled by the biocontroller and second measuring at the diagnostic system the at least one output variable, and if the at least one output variable is improved, in the expert controller:
  changing the mean of the at least one input variable to the new input variable value, N+1;
  changing the upper limit; and
 changing the lower limit by an amount equivalent to the difference (N+1)–N, wherein the upper limit is changed by a value greater than N+1–N; and
  if the at least one output variable is not improved in the expert controller:
   not changing the mean of the at least one input variable;
   not changing the lower limit; and
   decreasing the lower limit.

13. The method of controlling a reactor according to claim 12, wherein when the at least one output variable comprises a plurality, the plurality including product productivity, $-P_{product}$, and biomass density, $-P_{biomass}$, further comprising:
 ascribing a relationship between the product productivity and the biomass density according to $P=f(P_{product})+(1-f)(P_{biomass})$, wherein P is overall process productivity and f is a weighting factor in a range from 0 to 1.

14. The method of controlling a reactor according to claim 13, wherein the weighting factor, f, is varied comprising:
 when a present productivity of a first product is greater than its previous maximum productivity, then the weighting factor is increased;
 but when the weighting factor, as increased, is greater than 1, then the weighting factor is equal to 1;
 otherwise the weighting factor is decreased;
 otherwise when a present productivity of a second product is greater than its previous maximum productivity, then the weighting factor is decreased;
 otherwise the weighting factor is increased;
 but when the weighting factor is greater than 1, then the weighting factor is equal to 1; and
 repeating the method at least once, wherein the weighting factor is a highest retained value thereof.

15. A method of controlling a reactor comprising:
 establishing in an expert controller a split data distribution for at least one input variable, the split data distribution having a mean of N and a standard deviation, an upper limit, and a lower limit;
 running the reactor according to the at least one input variable as controlled by a biocontroller and first measuring at a diagnostic system at least one output variable from the reactor;
 decreasing in the expert controller a value of the at least one input variable from the mean to a new input variable value, N+1;
 running the reactor according to the value of the at least one input variable as controlled by the biocontroller and second measuring at the diagnostic, system the at least one output variable, and if the at least one output variable is improved, in the expert controller:
  changing the mean of the at least one input variable to the new input variable value, N+1;
  changing the lower limit by a first amount; and
  changing the upper limit by an amount equivalent to a difference (N+1)–N, wherein the lower limit is changed by a value greater than (N+1)–N; and
 if the at least one output variable is not improved, in the expert controller:
  not changing the mean of the at least one input variable;
  not changing the upper limit; and
  increasing the lower limit.

16. The method of controlling a reactor according to claim 15, wherein when the at least one output variable comprises a plurality, the plurality including product productivity, $-P_{product}$, and biomass density, $-P_{biomass}$, further comprising:
 ascribing a relationship between the product productivity and the biomass density according to $P=f(P_{product})+(1-f)(P_{biomass})$,
 wherein P is overall process productivity and f is a weighting factor in a range from 0 to 1.

17. The method of controlling a reactor according to claim 16, wherein the weighting factor, f, is varied comprising:
 when a present productivity of a first product is greater than its previous maximum productivity, then the weighting factor is increased;
 but when the weighting factor, as increased, is greater than 1, then the weighting factor is equal to 1;
 otherwise the weighting factor is decreased;

otherwise when a present productivity of a second product is greater than its previous maximum productivity, then the weighting factor is decreased;

otherwise the weighting factor is increased;

but when the weighting factor is greater than 1, then the weighting factor is equal to 1; and repeating the method at least once, wherein the weighting factor is a highest retained value thereof.

18. A method of controlling an ore treatment process including inoculating the ore with at least one microorganism culture, the at least one microorganism culture being used to make mineral values within the ore more susceptible to extractive metallurgy recovery techniques, the method including adjusting at least one input control variable and monitoring at least one output monitoring variable, comprising: establishing in an expert controller a split data distribution for a selected input parameter having a nominal area of unity, a mean, a standard deviation, an upper limit, and a lower limit;

in response to a run of the ore treatment process, first measuring at least one output variable in a diagnostic system;

changing in an expert controller a value of the selected input parameter;

in response to a further run of the ore treatment process according to the changed input parameter, second measuring the at least one output variable; and if the at least one output variable improves, in the expert controller:

adjusting the split data distribution by changing the upper and lower limits, one of the limits being changed more than the other of the limits; but if the at least one output variable does not improve, in the expert controller:

adjusting the split data distribution by changing only one of the limits.

19. The method of controlling an ore treatment process according to claim 18, wherein when the at least one output variable comprises a plurality, the plurality including product productivity, $-P_{product}$, and biomass density, $-P_{biomass}$, further comprising:

ascribing a relationship between the product productivity and the biomass density according to $P=f(P_{product})+(1-f)(P_{biomass})$, wherein P is overall process productivity and f is a weighting factor in a range from 0 to 1.

20. The method of controlling an ore treatment process according to claim 19, wherein the weighting factor, f, is varied comprising:

when a present productivity of a first product is greater than its previous maximum productivity, then the weighting factor is increased;

but when the weighting factor, as increased, is greater than 1, then the weighting factor is equal to 1;

otherwise the weighting factor is decreased;

otherwise when a present productivity of a second product is greater than its previous maximum productivity, then the weighting factor is decreased;

otherwise the weighting factor is increased;

but when the weighting factor is greater than 1, then the weighting factor is equal to 1; and repeating the method at least once, wherein the weighting factor is a highest retained value thereof.

21. A method of controlling a bioreactor with at least one input parameter and at least one output parameter, comprising the steps:

establishing in an expert controller a data distribution for the at least one input parameter, each of the data distribution having an upper fixed limit and a lower fixed limit, a mean, and a standard deviation;

randomly changing in the expert controller each of the at least one input parameter, updating the standard deviation, and calculating a change in its standard deviation;

monitoring in a diagnostic system any change in the at least one output parameter;

if the change in the at least one output parameter more closely approximates a desired output parameter:

quantifying in the diagnostic system a difference in the at least one input parameter;

if the difference in the at least one input parameter is an increase, in the expert controller:

updating a positive standard deviation by adding the change in the standard deviation, and updating a negative standard deviation by subtracting the change in the standard deviation;

if the difference in the at least one input parameter is a decrease:

updating a positive standard deviation by subtracting the change in the standard deviation, and updating a negative standard deviation by adding the change in the standard deviation;

if the change in the at least one output parameter does not more closely approximate the desired output parameter:

quantifying in the diagnostic system a difference in the at least one input parameter;

if the difference in the at least one input parameter is an increase in the expert controller:

updating a positive standard deviation by subtracting the change in the standard deviation, and updating a negative standard deviation by adding the change in the standard deviation;

if the difference in the at least one input parameter is a decrease:

updating a positive standard deviation by adding the change in the standard deviation, and updating a negative standard deviation by subtracting the change in the standard deviation;

if the positive standard deviation is less than about 0.001, ascribing in the expert controller a value thereof to about 0.001;

if the negative standard deviation is less than about 0.001, ascribing in the expert controller a value thereof to about 0.001; and repeating the steps at least once.

22. The method of controlling a system according to claim 21, wherein the system comprises at least one microbial strain and at least one material to be processed, wherein either or each of the at least one microbial strain and the at least one material to be processed is an uncharacterized microbial strain, and wherein the at least one input parameter includes at least one chemical, physical, or biological parameter.

23. A process controller system including sub-components comprising:

a stochastic learning algorithm that uses a split data distribution;

a sensor package;

at least one set point sub-controller;

an actuator package;

a productivity measure comprising a set of process goals and/or process outputs;

an interconnecting communication system between sub-components;

wherein the controller system acquires information from the sensor package, calculates a productivity measure, applies the productivity measure to the stochastic learning algorithm that uses the split data distribution, chooses at least one new set point to issue to the set point sub-controller, drives the actuator package, and optimizes the process.

24. The process controller system according to claim 23, wherein the stochastic learning algorithm comprises an expert system.

* * * * *